US009875375B2

(12) United States Patent
Matsuzaki et al.

(10) Patent No.: US 9,875,375 B2
(45) Date of Patent: Jan. 23, 2018

(54) METHOD FOR PERFORMING SIMILAR-INFORMATION SEARCH WHILE KEEPING CONTENT CONFIDENTIAL BY ENCRYPTION

(71) Applicant: Panasonic Intellectual Property Corporation of America, Torrance, CA (US)

(72) Inventors: Natsume Matsuzaki, Osaka (JP); Yuji Unagami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 128 days.

(21) Appl. No.: 15/163,674

(22) Filed: May 25, 2016

(65) Prior Publication Data

US 2016/0350552 A1    Dec. 1, 2016

(30) Foreign Application Priority Data

May 29, 2015   (JP) .................................. 2015-110873
Jan. 18, 2016   (JP) .................................. 2016-007480

(51) Int. Cl.
*H04L 29/06* (2006.01)
*G06F 21/62* (2013.01)
(Continued)

(52) U.S. Cl.
CPC .... *G06F 21/6227* (2013.01); *G06F 17/30867* (2013.01); *H04L 63/0428* (2013.01)

(58) Field of Classification Search
None
See application file for complete search history.

(56) References Cited

U.S. PATENT DOCUMENTS 9,749,128 B2 * 8/2017 Calapodescu ........... H04L 9/008
2008/0137840 A1 * 6/2008 Vanden Berghe ...... H04L 9/321
380/28

(Continued)

FOREIGN PATENT DOCUMENTS

JP   2010-237653   10/2010
JP   2014-126865   7/2014
JP   2014-126866   7/2014

OTHER PUBLICATIONS

Shigeo Mitsunari, "Kuraudo wo Sasaeru Korekara no Ango Gijutsu (Applied Cryptography for the Cloud)" Mar. 24, 2015.

(Continued)

*Primary Examiner* — Eric Chen
(74) *Attorney, Agent, or Firm* — Greenblum & Bernstein, P.L.C.

(57) ABSTRACT

A similar-information search method includes receiving, with a data computation device, an encrypted feature quantity and an encrypted similarity value from a user terminal device; calculating, with the data computation device, an encrypted distance between an encrypted reference feature quantity and the encrypted feature quantity; determining, with the data computation device, whether the encrypted distance matches the encrypted similarity value; generating, with the data computation device, encrypted reference data that is information obtained by encrypting reference data if it is determined that the encrypted distance matches the encrypted similarity value; and transmitting, with the data computation device, the generated encrypted reference data to the user terminal device.

9 Claims, 15 Drawing Sheets

(51) Int. Cl.
*G06F 17/30* (2006.01)
*H04L 9/32* (2006.01)
*G06F 11/30* (2006.01)

(56) References Cited

U.S. PATENT DOCUMENTS

| | | |
|---|---|---|
| 2010/0246812 A1 | 9/2010 | Rane et al. |
| 2013/0318351 A1* | 11/2013 | Hirano ................. H04L 9/3073 713/168 |
| 2014/0185794 A1 | 7/2014 | Yasuda et al. |
| 2014/0185797 A1 | 7/2014 | Yasuda et al. |
| 2014/0289536 A1* | 9/2014 | MacCarthy ............. G06F 19/22 713/189 |
| 2016/0048690 A1* | 2/2016 | Tanishima ............. G06F 19/22 713/193 |

OTHER PUBLICATIONS

D. Boneh et al., "Evaluating 2-DNF Formulas on Ciphertexts" In proceedings of Theory of Cryptography TCC 2005, LNCS 3378, pp. 325-341, 2005.

* cited by examiner

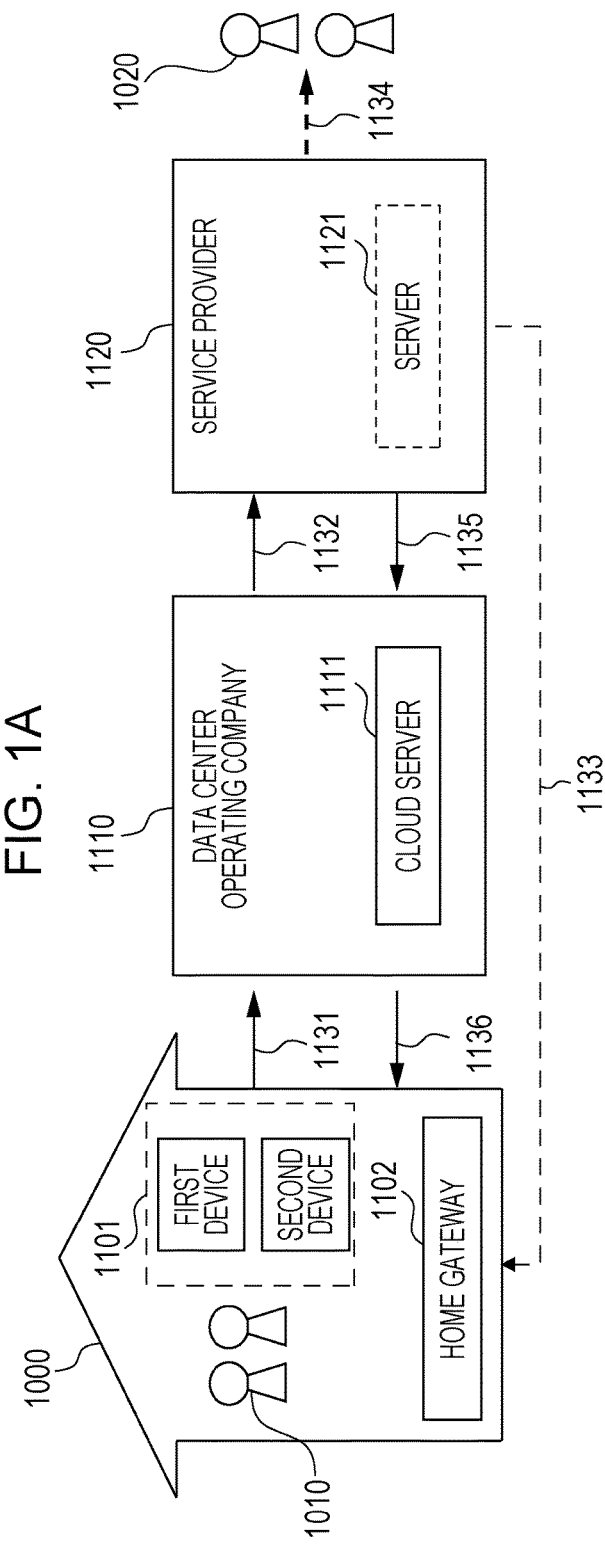
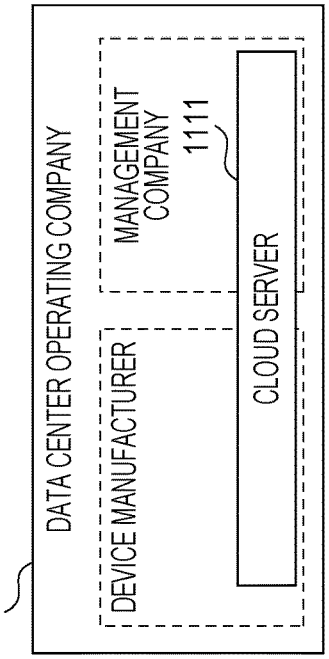
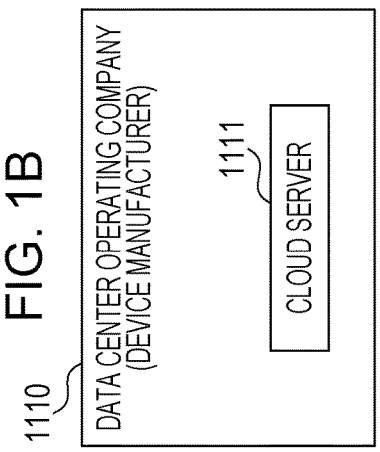

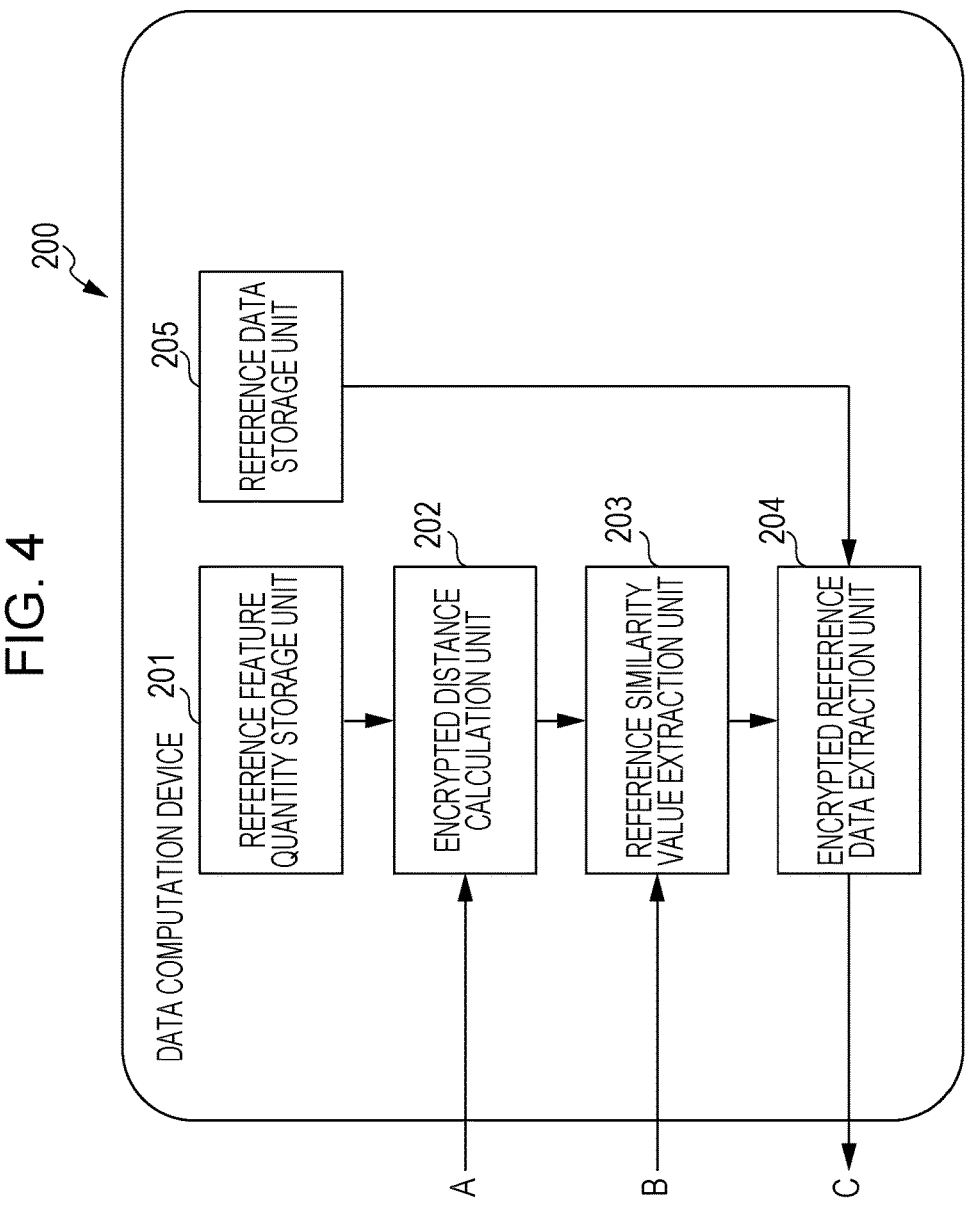

| IDENTIFIER ID | REFERENCE FEATURE QUANTITY Yi |
|---|---|
| 1 | $Y1 = (y11, y12, y13\cdots)$ |
| 2 | $Y2 = (y21, y22, y23\cdots)$ |
| 3 | $Y3 = (y31, y32, y33\cdots)$ |
| ⋮ | ⋮ |

| IDENTIFIER ID | REFERENCE DATA Zi |
|---|---|
| 1 | Z1 = (HOSPITALIZED FOR CEREBRAL INFARCTION IN OCTOBER, 2013) |
| 2 | Z2 = (STARTED TREATMENT FOR DIABETES IN FEBBRUARY, 1999) |
| 3 | Z3 = (ADVISED ABOUT DIET IN MARCH 2010, COMPLETELY CURED IN 2012) |
| ⋮ | ⋮ |

FIG. 7A

| SOURCE | DESTINATION | COMMAND | DATA | |
|---|---|---|---|---|
| USER TERMINAL DEVICE 100 | DATA COMPUTATION DEVICE 200 | SIMILAR DATA REQUEST COMMAND | ENCRYPTED FEATURE QUANTITY | ENCRYPTED SIMILARITY VALUE |

| SOURCE | DESTINATION | COMMAND | DATA | |
|---|---|---|---|---|
| DATA COMPUTATION DEVICE 200 | USER TERMINAL DEVICE 100 | SIMILAR DATA RESPONSE COMMAND | ENCRYPTED REFERENCE DATA 1 | ENCRYPTED REFERENCE DATA 2 |

S111

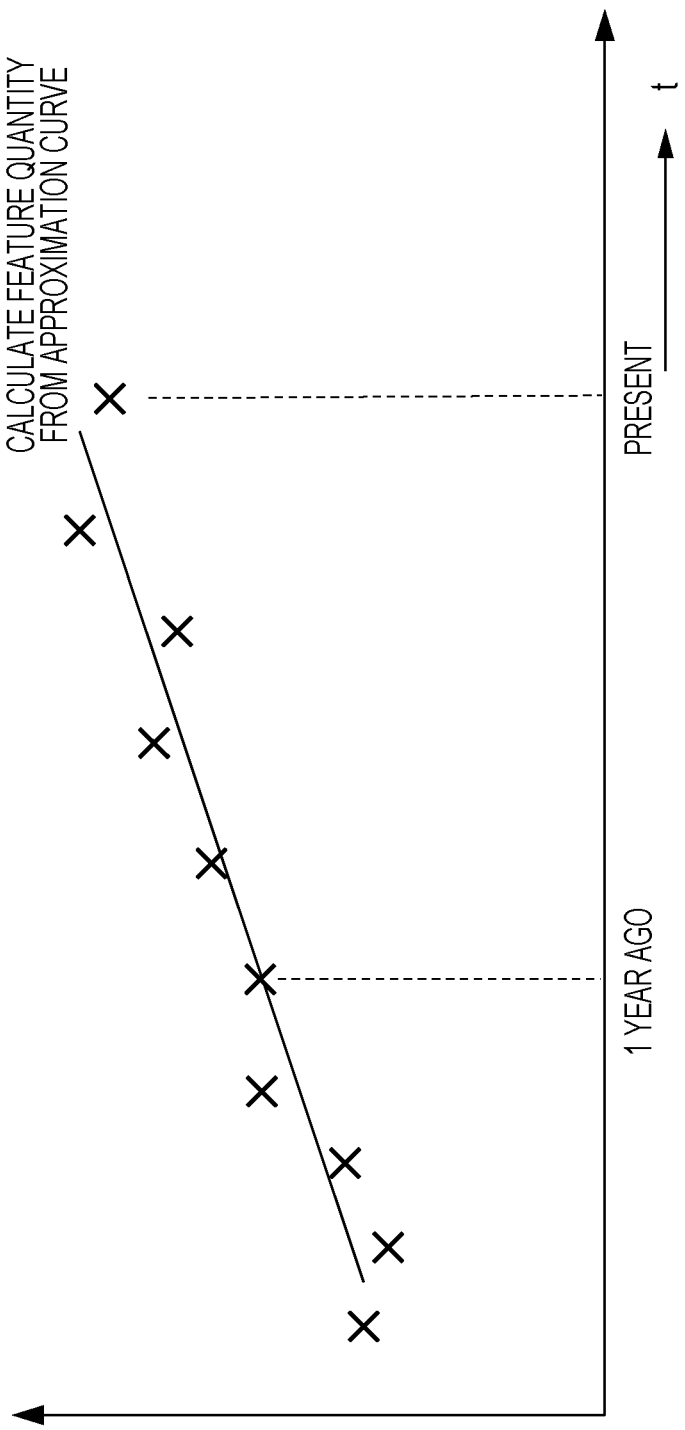

METHOD FOR PERFORMING SIMILAR-INFORMATION SEARCH WHILE KEEPING CONTENT CONFIDENTIAL BY ENCRYPTION

BACKGROUND

1. Technical Field

The present disclosure relates to a method, a server device, and a system for performing a similar-information search while keeping content confidential by encryption.

2. Description of the Related Art

Recently, systems have been available in which a user measures, for example, blood pressure at home and a server provides advice about diet or the like to the user on the basis of an analysis of blood pressure. Advice that is more valuable and convincing for the user can be provided if not only information about the user previously obtained but also similar cases are referred to during the analysis before the advice is provided. From the viewpoint of privacy protection, the information about the user and information about other cases that are referred to are desirably kept confidential by encryption when the server searches for similar cases. Japanese Unexamined Patent Application Publication Nos. 2014-126865 and 2014-126866 and Japanese Patent No. 5542474 disclose techniques for performing a similar-information search while maintaining encryption.

SUMMARY

Further improvements have been needed for a similar-information search in the related art.

One non-limiting and exemplary embodiment provides a similar-information search method, a server device, and a similar-information search system that reduces an amount of calculation performed for processing by a terminal device and the number of times of communications performed between a server device and the terminal device.

In one general aspect, the techniques disclosed here feature a similar-information search method for a similar-information search system including a terminal device and a server device that are connected to each other via a network, the server device including a first memory that stores a plurality of reference feature quantities and a second memory that stores a plurality of pieces of reference data each corresponding to one of the plurality of reference feature quantities, the search method including the server device receiving from the terminal device, a first encrypted feature quantity obtained by encrypting a first feature quantity using a first encryption scheme; the server device obtaining a second encrypted feature quantity by encrypting, using the first encryption scheme, a first reference feature quantity that is one of the plurality of reference feature quantities stored in the first memory; the server device receiving from the terminal device, an encrypted similarity value that is information obtained by encrypting, using the first encryption scheme, a similarity value indicating a degree of similarity; the server device calculating an encrypted distance indicating a degree of similarity between the first encrypted feature quantity and the second encrypted feature quantity, with the first encrypted feature quantity and the second encrypted feature quantity kept encrypted; the server device determining whether the calculated encrypted distance matches the received encrypted similarity value; the server device obtaining from the second memory, first reference data that is data corresponding to the first reference feature quantity used in the calculating of the encrypted distance in a case where it is determined in the determining that the calculated encrypted distance matches the received encrypted similarity value, the server device generating encrypted reference data by encrypting the obtained first reference data using a second encryption scheme; and the server device transmitting the generated encrypted reference data to the terminal device.

It should be noted that general or specific embodiments may be implemented as a system, a device, an integrated circuit, a computer program, or a storage medium such as a computer-readable compact disc-read only memory (CD-ROM), or any selective combination thereof.

According to the disclosed embodiments, the amount of calculation performed for processing by the terminal device and the number of times of communications performed between the server device and the terminal device can be reduced.

Additional benefits and advantages of the disclosed embodiments will become apparent from content of the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1A is a block diagram illustrating an overview of a service provided by a similar-information search system in accordance with embodiments;

FIG. 1B is a block diagram illustrating an example in which a device manufacturer serves as a data center operating company in accordance with the embodiments;

FIG. 1C is a block diagram illustrating an example in which both of or one of the device manufacturer and a management company serve as the data center operating company in accordance with the embodiments;

FIG. 4 is a block diagram illustrating a configuration of a data computation device in accordance with the first embodiment;

FIG. 5A is a diagram illustrating an example of a reference feature quantity storage unit of the data computation device in accordance with the first embodiment;

FIG. 5B is a diagram illustrating an example of a reference data storage unit of the data computation device in accordance with the first embodiment;

FIG. 7A is a diagram illustrating an example of a data format used by the user terminal device and the data computation device in accordance with the first embodiment;

FIG. 7B is a diagram illustrating an example of a data format used by the user terminal device and the data computation device in accordance with the first embodiment;

FIG. 9 is a graph illustrating an example of how a feature quantity is calculated with respect to time, which is displayed by the user terminal device in accordance with the first embodiment;

DETAILED DESCRIPTION

Figure 2:
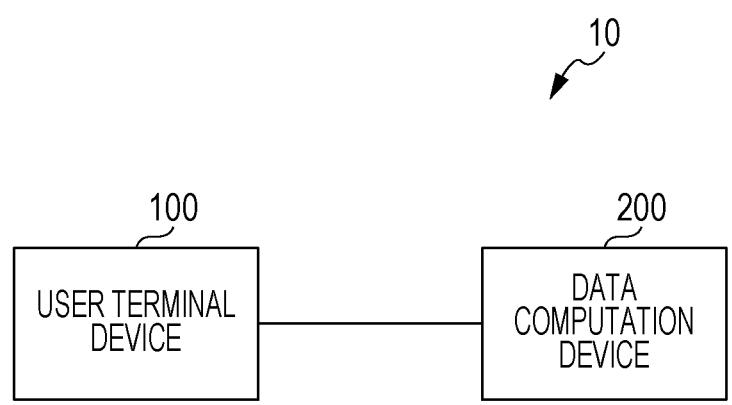
FIG. 2 is a block diagram illustrating an overall configuration of the similar-information search system in accordance with a first embodiment.

Underlying Knowledge Forming Basis of the Present Disclosure

There are methods for performing a similar-information search while maintaining encryption. In such a case, however, a server calculates an encrypted distance but is unable determine whether the calculated encrypted distance matches a specified similarity value because the server does not have the corresponding secret key. To determine whether the calculated encrypted distance matches the specified similarity value, decryption needs to be performed using the secret key of a user terminal. Implementing the determination with the user terminal increases an amount of calculation and an amount of communication.

In view of such a consideration, the inventors have conceived aspects of the present disclosure.

A similar-information search method according to an aspect of the present invention is a search method for a similar-information search system including a terminal device and a server device that are connected to each other via a network, the server device including a first memory that stores a plurality of reference feature quantities and a second memory that stores a plurality of pieces of reference data each corresponding to one of the plurality of reference feature quantities, the search method including:

the server device receiving from the terminal device, a first encrypted feature quantity obtained by encrypting a first feature quantity using a first encryption scheme;

the server device obtaining a second encrypted feature quantity by encrypting, using the first encryption scheme, a first reference feature quantity that is one of the plurality of reference feature quantities stored in the first memory;

the server device receiving from the terminal device, an encrypted similarity value that is information obtained by encrypting, using the first encryption scheme, a similarity value indicating a degree of similarity;

the server device calculating an encrypted distance indicating a degree of similarity between the first encrypted feature quantity and the second encrypted feature quantity, with the first encrypted feature quantity and the second encrypted feature quantity kept encrypted;

the server device determining whether the calculated encrypted distance matches the received encrypted similarity value;

the server device obtaining from the second memory, first reference data that is data corresponding to the first reference feature quantity used in the calculating of the encrypted distance in a case where it is determined in the determining that the calculated encrypted distance matches the received encrypted similarity value;

the server device generating encrypted reference data by encrypting the obtained first reference data using a second encryption scheme; and the server device transmitting the generated encrypted reference data to the terminal device.

With this configuration, an amount of calculation performed for processing by the terminal device is reduced, compared with the case where the terminal device determines whether the encrypted distance matches the encrypted similarity value.

In addition, the number of times of communications performed between the server device and the terminal device can be reduced, compared with the case where the terminal device determines whether the encrypted distance matches the encrypted similarity value.

In addition, in the receiving of the encrypted similarity value, a plurality of encrypted similarity values that are pieces of information obtained by encrypting a plurality of similarity values indicating a plurality of degrees of similarity may be received, and in the determining, it may be determined, for each of the plurality of received encrypted similarity values, whether the calculated encrypted distance matches the received encrypted similarity value.

With this configuration, an amount of calculation performed for processing by the terminal device is further reduced, and the number of times of communications performed between the server device and the terminal device is further reduced.

In addition, in this similar-information search method, the encrypted distance may be a Euclidean distance between the first encrypted feature quantity and the second encrypted feature quantity.

With this configuration, this similar-information search method can be more specified.

In addition, this similar-information search method may further include the server device receiving a converted key value that is information obtained by converting a secret key of the terminal device using a certain function, wherein, in the receiving of the encrypted similarity value, a converted similarity value that is information obtained by converting the similarity value using the certain function may be received as the encrypted similarity value, and wherein, in the determining, a converted distance may be generated by decrypting the encrypted distance by using the converted key value and it may be determined whether the generated converted distance matches the converted similarity value.

With this configuration, if the user performs a search based on the same information using probabilistic encryption containing a random number, the encrypted feature quantity does not have the same value. Accordingly, this similar-information search method can enhance the confidentiality of the information searched for by the user over a transmission channel from the terminal device to the server device and in the server device. As a result, the use of the probabilistic encryption makes an analysis based on a frequency in ciphertexts more difficult and can enhance the security.

In addition, in this similar-information search method, the certain function may be a one-way function.

With this configuration, since the key used for decryption is converted by using a one-way function, it is difficult for the server device to determine the key. Accordingly, with the similar-information search method, the confidentiality of the information about the user is more likely to be protected.

In addition, this similar-information search method may further include the terminal device obtaining data subjected to a similar-information search;

the terminal device calculating the first feature quantity indicating a feature of the obtained data;

the terminal device generating, the first encrypted feature quantity by encrypting the calculated first feature quantity using the first encryption scheme;

the terminal device transmitting the generated first encrypted feature quantity to the server device;

the terminal device setting the similarity value indicating a degree of similarity;

the terminal device generating the encrypted similarity value by encrypting the set similarity value using the first encryption scheme;

the terminal device transmitting the generated encrypted similarity value to the server device;

the terminal device receiving the encrypted reference data from the server device; and the terminal device decrypting the received encrypted reference data by using the second encryption scheme.

With this configuration, the terminal device does not determine whether the encrypted distance matches the encrypted similarity value. Accordingly, the amount of calculation performed for processing by the terminal device is reduced, and the number of times of communications performed between the server device and the terminal device can be reduced.

In addition, in this similar-information search method, the first encryption scheme may be a homomorphic encryption scheme.

With this configuration, a homomorphic encryption scheme is an encryption scheme that makes decryption by the server device unsuccessful, and the key used in this scheme is a public key of the terminal device. Accordingly, this similar-information search method can enhance the confidentiality of the information searched for by the user during transmission from the terminal device to the server device and in the server device.

A server device according to an aspect of the present disclosure includes a first memory that stores a plurality of reference feature quantities;

a second memory that stores a plurality of pieces of reference data each corresponding to one of the plurality of reference feature quantities; and circuitry which, in operation;

receives, from a terminal device, a first encrypted feature quantity obtained by encrypting a first feature quantity using a first encryption scheme;

obtains a second encrypted feature quantity by encrypting, using the first encryption scheme, a first reference feature quantity that is one of the plurality of reference feature quantities stored in the first memory;

receives, from the terminal device, an encrypted similarity value that is information obtained by encrypting, using the first encryption scheme, a similarity value indicating a degree of similarity;

calculates an encrypted distance indicating a degree of similarity between the first encrypted feature quantity and the second encrypted feature quantity, with the first encrypted feature quantity and the second encrypted feature quantity kept encrypted;

determines whether the calculated encrypted distance matches the received encrypted similarity value;

obtains, from the second memory, first reference data that is data corresponding to the first reference feature quantity used in the calculation of the encrypted distance in a case where it is determined in the determination that the calculated encrypted distance matches the received encrypted similarity value;

generates encrypted reference data by encrypting the obtained first reference data using a second encryption scheme; and transmits the generated encrypted reference data to the terminal device.

A similar-information search system according to an aspect of the present disclosure includes a terminal device and a server device connected to each other via a network, the server device including a first memory that stores a plurality of reference feature quantities;

a second memory that stores a plurality of pieces of reference data each corresponding to one of the plurality of reference feature quantities; and circuitry which, in operation;

receives, from the terminal device, a first encrypted feature quantity obtained by encrypting a first feature quantity using a first encryption scheme;

obtains a second encrypted feature quantity by encrypting, using the first encryption scheme, a first reference feature quantity that is one of the plurality of reference feature quantities stored in the first memory;

receives, from the terminal device, an encrypted similarity value that is information obtained by encrypting, using the first encryption scheme, a similarity value indicating a degree of similarity;

calculates an encrypted distance indicating a degree of similarity between the first encrypted feature quantity and the second encrypted feature quantity, with the first encrypted feature quantity and the second encrypted feature quantity kept encrypted;

determines whether the calculated encrypted distance matches the received encrypted similarity value;

obtains, from the second memory, first reference data that is data corresponding to the first reference feature quantity used in the calculation of the encrypted distance in a case where it is determined in the determination that the calculated encrypted distance matches the received encrypted similarity value;

generates encrypted reference data by encrypting the obtained first reference data using a second encryption scheme; and transmits the generated encrypted reference data to the terminal device.

With this configuration, an amount of calculation performed for processing by the terminal device is reduced, compared with the case where the terminal device determines whether the encrypted distance matches the encrypted similarity value.

In addition, the number of times of communications performed between the server device and the terminal device is unlikely to increase.

Accordingly, the server device and the similar-information search system can reduce the amount of calculation performed for processing by the terminal device and the number of times of communications performed between the server device and the terminal device.

Embodiments described hereinafter provides a specific example of the present disclosure. The values, shapes, components, steps, orders of the steps, etc., given in the following embodiments are illustrative, and are not intended to limit the present disclosure. In addition, among the components in the following embodiments, a component not recited in any of the independent claims indicating the most generic concept of the present disclosure is described as an optional component. In addition, every embodiment may be combined with every other embodiment.

Overview of Provided Service

An overview of a service provided by a similar-information search system according to embodiments will be described first with reference to FIGS. 1A, 1B, and 1C.

FIG. 1A is a block diagram illustrating an overview of a service provided by a similar-information search system in accordance with the embodiments. FIG. 1B is a block diagram illustrating an example in which a device manufacturer serves as a data center operating company in accordance with the embodiments. FIG. 1C is a block diagram illustrating an example in which both of or one of the device manufacturer and a management company serve as the data center operating company in accordance with the embodiments.

The similar-information search system includes a group 1000, a data center operating company 1110, and a service provider 1120.

The group 1000 may be, for example, a company, an organization, or a home and may be a group of any given scale. The group 1000 includes a plurality of devices 1101 including a first device and a second device, and a home gateway 1102. Examples of the plurality of devices 1101 include devices connectable to the Internet (e.g., a smartphone, a personal computer (PC), and a television) and devices not connectable to the Internet on their own (e.g., a light, a washing machine, and a refrigerator). The plurality of devices 1101 may include devices that are not connectable to the Internet on their own but are connectable to the Internet via the home gateway 1102. Users 1010 use the plurality of devices 1101 in the group 1000.

The data center operating company 1110 includes a cloud server 1111. The cloud server 1111 is a virtual server that operates in cooperation with various devices via the Internet. Typically, the cloud server 1111 manages big data that is difficult to handle with an ordinary database management tool or the like. The data center operating company 1110 performs management of data, management of the cloud server 1111, and operation of the data center where such management is performed. Details of services provided by the data center operating company 1110 will be described later.

The data center operating company 1110 is not necessary a company that performs only management of data or management of the cloud server 1111. For example, in the case where a device manufacturer that develops or manufactures one of the plurality of devices 1101 also performs management of data or management of the cloud server 1111 as illustrated in FIG. 1B, the device manufacturer serves as the data center operating company 1110. In addition, the data center operating company 1110 is not necessarily run by one company. For example, in the case where a device manufacturer and a management company perform management of the data or management of the cloud server 1111 together or in a shared manner as illustrated in FIG. 1C, both of or one of the device manufacturer and the management company serve as the data center operating company 1110.

The service provider 1120 includes a server 1121. Herein, the server 1121 may be a server of any given scale. Examples of the server 1121 include a memory included in a PC. In addition, the service provider 1120 does not necessarily include the server 1121.

Note that the home gateway 1102 is not mandatory to the similar-information search system. For example, the home gateway 1102 is not needed in the case where the cloud server 1111 performs management of all data. In addition, there may be a case where devices that are not connectable to the Internet on their own do not exist as in the case where every device at home is connected to the Internet.

Now, the flow of information in the similar-information search system will be described.

First, the first device or the second device in the group 1000 transmits log information to the cloud server 1111 of the data center operating company 1110. The cloud server 1111 accumulates the log information of the first device or the second device (arrow 1131 in FIG. 1A). Note that log information is, for example, information indicating the operating state or the operation date/time of the plurality of devices 1101. Examples of the log information include a history of viewing a television, information about scheduled recording in a recorder, an operation date/time of a washing machine, a weight of laundry, an opening/closing date/time of a refrigerator, and the number of times the refrigerator is opened and closed; however, the log information is not limited to these pieces of information and may include various kinds information that can be obtained from various devices. The log information may be provided directly to the cloud server 1111 from the plurality of devices 1101 via the Internet, or may be temporarily accumulated in the home gateway 1102 from the plurality of devices 1101 and then provided to the cloud server 1111 from the home gateway 1102.

Then, the cloud server 1111 of the data center operating company 1110 provides the accumulated log information to the service provider 1120 in a certain unit. The certain unit may be a unit in which the data center operating company 1110 can organize and provide the accumulated information to the service provider 1120 or a unit requested by the service provider 1120. The log information need not necessarily be provided in the certain unit, and an amount of provided information may change depending on the circumstances. The log information is stored in the server 1121 of the service provider 1120 if necessary (arrow 1132 in FIG. 1A).

Then, the service provider 1120 organizes the log information into information suitable for the service provided to the user, and provides the information to the user. The user provided with the information may be the user 1010 who uses the plurality of devices 1101 or may be an outside user (hereinafter, simply referred to as a user) 1020. As for the method for providing the information to the users 1010 and 1020, the information may be provided directly to the users 1010 and 1020 from the service provider 1120 (dashed-line arrows 1133 and 1134 in FIG. 1A), for example. As for the method for providing the service to the user 1010, the information may be provided to the user 1010 via the cloud server 1111 of the data center operating company 1110 (arrows 1135 and 1136 in FIG. 1A), for example. In addition, the cloud server 1111 of the data center operating company 1110 may organize the log information into information suitable for the service provided to the users 1010 and 1020 and then provide the resulting information to the service provider 1120.

Note that the user 1010 and the user 1020 may be the same user or different users.

First Embodiment

A similar-information search system related to the present disclosure will now be described as a first embodiment of the present disclosure, with reference to the drawings.

1.1 Overall Configuration of Similar-Information Search System

FIG. 2 is a block diagram illustrating an overall configuration of a similar-information search system in accordance with a first embodiment.

As illustrated in FIG. 2, a similar-information search system 10 includes a user terminal device 100, which is an example of a terminal device, and a data computation device 200, which is an example of a server device. The user terminal device 100 requests the data computation device 200 to perform a search. The data computation device 200 searches for similar information on the basis of information provided by the user terminal device 100 and provides the retrieved similar information to the user terminal device 100.

The similar-information search system 10 may include a plurality of user terminal devices 100 and a plurality of data computation devices 200. For example, the plurality of user terminal devices 100 may be connected to one data computation device 200, or the plurality of data computation devices 200 may be connected to one user terminal device 100. In addition, the user terminal device 100 and the data computation device 200 may be connected in any given manner, such as via a wired Internet line, via wireless communication, or via dedicated communication. Note that communication does not necessarily need to be performed in real time in this similar-information search system 10. For example, the user terminal device 100 may collect a certain amount of information by sensing or a certain number of similar-information search requests and then collectively transmit the information or the requests to the data computation device 200.

1.2 User Terminal Device

Figure 3:
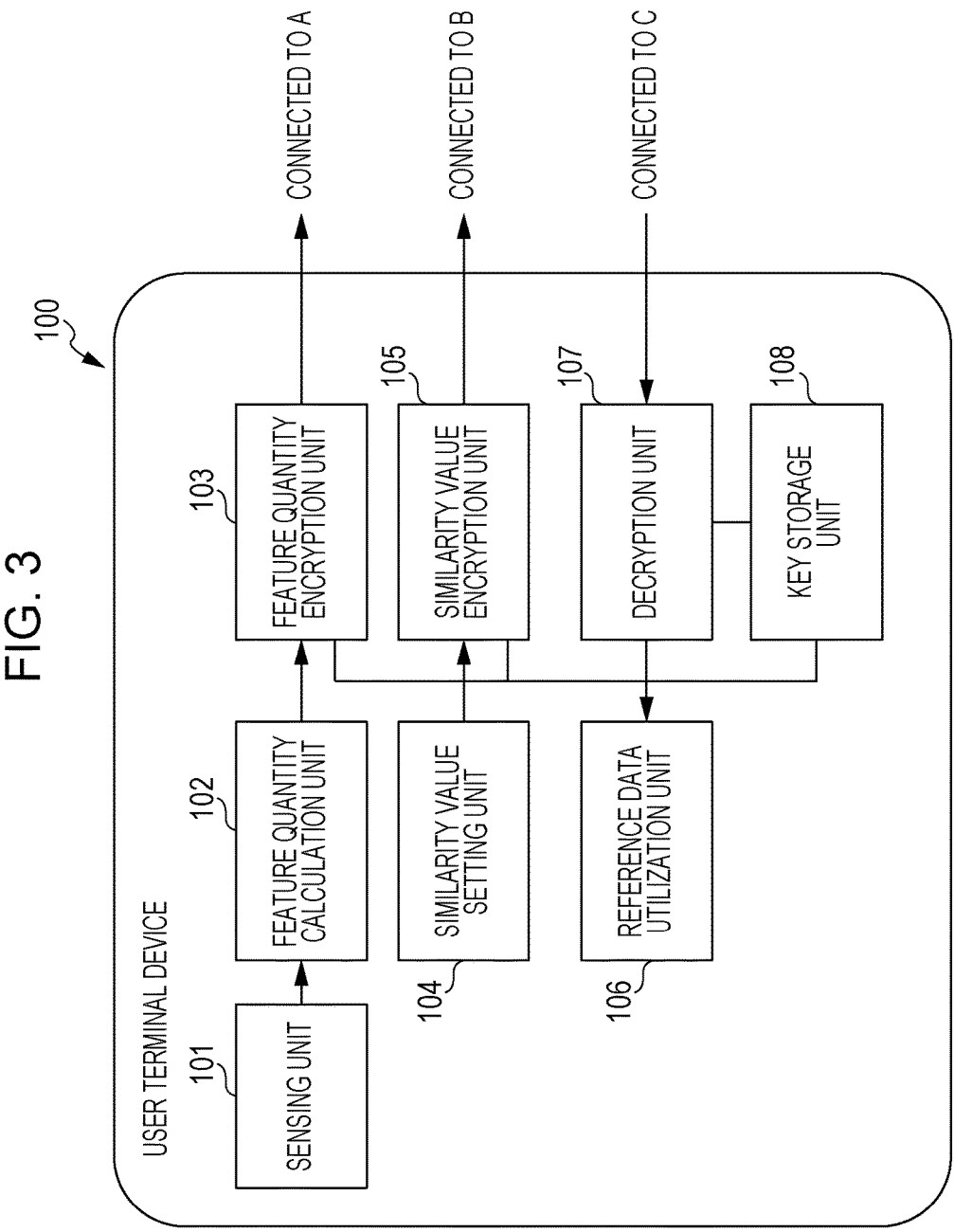
FIG. 3 is a block diagram illustrating a configuration of a user terminal device in accordance with the first embodiment.

FIG. 3 is a block diagram illustrating a configuration of the user terminal device 100 in accordance with the first embodiment.

The user performs an encrypted search in which a search is performed using encrypted information. That is, the user terminal device 100 requests the data computation device 200 that searches for similar information to perform a search. As illustrated in FIG. 3, the user terminal device 100 includes a sensing unit 101, a feature quantity calculation unit 102, a feature quantity encryption unit 103, a similarity value setting unit 104, a similarity value encryption unit 105, a reference data utilization unit 106, a decryption unit 107, and a key storage unit 108.

The feature quantity encryption unit 103, the similarity value encryption unit 105, and the decryption unit 107 are connected to corresponding components (indicated by A, B, and C, respectively) of the data computation device 200 illustrated in FIG. 4. The user terminal device 100 performs sensing to obtain information about a user, such as blood pressure information, facial color information, and computed tomography (CT) scan information, and extracts a feature quantity indicating a feature of the obtained data. The user terminal device 100 then requests the data computation device 200 to provide reference data of a symptom similar to this feature quantity and utilizes the obtained reference data in the service provided to the user. The user terminal device 100 obtains a certain type of agreement from the user before it performs sensing to obtain information about the user. Note that a procedure of obtaining the agreement is not within the scope of the present disclosure.

1.2.1 Sensing Unit

The sensing unit 101 performs sensing on a user. Examples of data obtained by sensing include data of vital signs such as blood pressure and temperature of the user, image data such as data of a user's face image, an ultrasound image, and a CT scan image, and answering voice data. In addition, the data obtained by sensing may be user's location information (global positioning system (GPS) information), shopping log information, or the like.

1.2.2 Feature Quantity Calculation Unit

The feature quantity calculation unit 102 calculates a feature quantity from the data obtained by the sensing unit 101. The calculated feature quantity may be, for example, data such as a main component of a characteristic parameter in image information of a face or the like or a position, area, or width of a certain area. In addition, the feature quantity may be, for example, a coefficient of a polynomial obtained by converting a tendency of log information with respect to the time axis. Further, the feature quantity may be a numerical value or a vector value including a list of numerical values.

1.2.3 Feature Quantity Encryption Unit

The feature quantity encryption unit 103 encrypts the feature quantity calculated by the feature quantity calculation unit 102 and denoting a feature of the data to generate an encrypted feature quantity. The feature quantity encryption unit 103 also transmits the generated encrypted feature quantity to the data computation device 200. It is assumed that the encryption scheme used is homomorphic encryption, which allows the data computation device 200 to perform computation for a similar-information search by using the encrypted feature quantity. When the feature quantity is kept confidential from the data computation device 200, a public key of the user terminal device 100, which is stored in the key storage unit 108 (described later), is used.

1.2.4 Similarity Value Setting Unit

The similarity value setting unit 104 sets a similarity value that indicates a degree of similarity used in a search. The term "similarity value" used herein refers to a value indicating the degree of similarity between to the feature quantity and information to be searched for by the data computation device 200. For example, the data computation device 200 calculates Euclidean distance between the feature quantity and a reference feature quantity. In the case where information for which the Euclidean distance is smaller than a certain value D is searched for, the certain value D is set as the similarity value. Alternatively, all the values 0, 1, . . . , D−1 smaller than the certain value D may be set as the similarity values. Alternatively, the similarity value may be set for each vector component value of the feature quantity.

1.2.5 Similarity Value Encryption Unit

The similarity value encryption unit 105 encrypts the similarity value, which indicates the degree of similarity, to generate an encrypted similarity value. The similarity value encryption unit 105 also transmits the generated encrypted similarity value to the data computation device 200. The encrypted similarity value is used by the data computation device 200 to determine whether a reference feature quantity is similar to the encrypted feature quantity in an encrypted state and to extract a reference ID that satisfies a similarity condition.

1.2.6 Decryption Unit

The decryption unit 107 receives, from the data computation device 200, encrypted reference data, which is information obtained by encrypting reference data (similar-information search result) that is obtained based on the encrypted feature quantity and the encrypted similarity value through the similar-information search requested by the user terminal device 100. The decryption unit 107 then decrypts the received encrypted reference data.

1.2.7 Reference Data Utilization Unit

The reference data utilization unit 106 utilizes reference data obtained by the decryption unit 107 through decryption. For example, the reference data utilization unit 106 displays a graph or a statistical value of the reference data on the user terminal device 100 or provides the user with advice about how to improve the lifestyle or about recommended diet by using such information.

1.2.8 Key Storage Unit

The key storage unit 108 stores keys used by the feature quantity encryption unit 103, the similarity value encryption unit 105, and the decryption unit 107. The encryption schemes and the keys used by the feature quantity encryption unit 103, the similarity value encryption unit 105, and the decryption unit 107 may be the same or may be different. For example, the key used by the feature quantity encryption unit 103 and the similarity value encryption unit 105 may be the public key of the user terminal device 100 used in a homomorphic encryption scheme. Note that the corresponding secret key is also stored in the key storage unit 108. The key used by the decryption unit 107 may be the secret key of the user terminal device 100 used in a public key encryption scheme that is not the homomorphic encryption scheme. Note that the corresponding public key is shared with the data computation device 200. Alternatively, the key used by the decryption unit 107 may be the secret key of the user terminal device 100 used in the homomorphic encryption scheme just like the key used by the feature quantity encryption unit 103.

1.3 Data Computation Device

FIG. 4 is a block diagram illustrating a configuration of the data computation device 200 in accordance with the first embodiment.

The data computation device 200 searches, in response to a search request from a user, for similar information on the basis of information provided by the user terminal device 100 and provides the retrieved information to the user terminal device 100. As illustrated in FIG. 4, the data computation device 200 includes a reference feature quantity storage unit 201, an encrypted distance calculation unit 202, a reference similarity value extraction unit 203, an encrypted reference data extraction unit 204, and a reference data storage unit 205. The encrypted distance calculation unit 202, the reference similarity value extraction unit 203, and the encrypted reference data extraction unit 204 are connected to corresponding components (indicated by A, B, and C, respectively) of the user terminal device 100 illustrated in FIG. 3.

1.3.1 Reference Feature Quantity Storage Unit

FIG. 5A is a diagram illustrating an example of the reference feature quantity storage unit 201 of the data computation device 200 in the first embodiment. FIG. 5A illustrates an example of reference feature quantities stored in the reference feature quantity storage unit 201.

As illustrated in FIG. 5A, the reference feature quantity storage unit 201 stores reference feature quantities Yi to be searched when the data computation device 200 performs a similar-information search. Note that an identifier ID corresponds to "i", and each reference feature quantity is denoted by Yi. The identifier ID and the reference feature quantity are stored in the reference feature quantity storage unit 201 in pairs. In FIG. 5A, the reference feature quantities Y1, Y2, . . . respectively corresponding to the identifiers IDs 1, 2, . . . are stored. It is assumed in this example that each reference feature quantity is denoted as a vector value. Note that the reference feature quantities may be encrypted before they are stored.

1.3.2 Encrypted Distance Calculation Unit

The encrypted distance calculation unit 202 receives, from the user terminal device 100, an encrypted feature quantity, which is obtained by encryption using the homomorphic encryption scheme. The encrypted distance calculation unit 202 calculates an encrypted distance, which indicates a degree of similarity between the received encrypted feature quantity and at least one of the plurality of reference feature quantities, while keeping the received feature quantity and the reference feature quantities encrypted. That is, the encrypted distance calculation unit 202 calculates a distance between the feature quantity generated by the user terminal device 100 and a reference feature quantity stored in the data computation device 200. Specifically, the encrypted distance calculation unit 202 encrypts a reference feature quantity received from the reference feature quantity storage unit 201. The encrypted distance calculation unit 202 then calculates a distance between the encrypted feature quantity received from the user terminal device 100 and the encrypted reference feature quantity, while keeping these feature quantities encrypted.

The encrypted distance calculation unit 202 then outputs the encrypted distance, which is a distance that has been encrypted, to the reference similarity value extraction unit 203. The encrypted distance is a Euclidean distance between the reference feature quantity and the feature quantity. The encrypted distance may be, for example, an absolute value of a difference between these feature quantities if the feature quantities are numerical values or the sum of absolute values of differences between the corresponding vector components if the feature quantities are vectors including numerical values as their components. Alternatively, the encrypted distance may be a cosine similarity, which is a sum of the products of the corresponding vector components.

Specifically, suppose that the feature quantity and the reference feature quantity are vectors having numerical values as their components and are denoted as (x1, x2, x3, . . . , xn) and (y11, y12, y13, . . . , y1n), respectively. In such a case, the distance obtained by adding absolute values of differences between the corresponding vector components is denoted as $\Sigma|xi-y1i|$, the cosine similarity is denoted as $\Sigma xi \times \Sigma y1i$, and the Euclidean distance is denoted as $\Sigma(xi-y1i)^2$. Since the encrypted distance calculation unit 202 performs this calculation with the feature quantity and the reference feature quantity kept encrypted, the homomorphic encryption scheme is used. During computation using the homomorphic encryption scheme, the calculation may be performed for each component of the vector value. Alternatively, to speed up the calculation, the distance may be calculated using the homomorphic encryption scheme by performing computations on polynomials in each of which a vector value of the corresponding feature quantity is mapped as a coefficient.

1.3.3 Reference Similarity Value Extraction Unit

The reference similarity value extraction unit 203 receives the encrypted similarity value from the similarity value encryption unit 105. The encrypted similarity value is information obtained by encrypting a similarity value, which indicates the degree of similarity. Note that this encrypted information is preferably obtained by encryption using the homomorphic encryption scheme.

The reference similarity value extraction unit 203 determines whether the distance matches the similarity value by using the encrypted similarity value received from the similarity value encryption unit 105 and the encrypted distance received from the encrypted distance calculation unit 202. Note that the encrypted distance matching the encrypted similarity value is synonymous with the distance matching the similarity value. If the reference similarity value extraction unit 203 determines that the distance matches the similarity value, the reference similarity value extraction unit 203 extracts the identifier ID of the corresponding reference feature quantity. If the reference similarity value extraction unit 203 determines that the encrypted distance does not match the encrypted similarity value, the reference similarity value extraction unit 203 does not extract the identifier ID of the corresponding reference feature quantity.

1.3.4 Reference Data Storage Unit

FIG. 5B is a diagram illustrating an example of the reference data storage unit 205 of the data computation device 200 in the first embodiment. FIG. 5B illustrates an example of the identifiers IDs and pieces of reference data stored in the reference data storage unit 205.

As illustrated in FIG. 5B, the reference data storage unit 205 stores pieces of reference data to be searched by the data computation device 200 to perform a similar-information search. The identifier ID and the reference data are stored in the reference data storage unit 205 in pairs. The pieces of reference data $Z1, Z2, \ldots, Zi$ respectively corresponding to the identifiers IDs $1, 2, \ldots, i$ are stored in the reference data storage unit 205. Note that the identifier ID corresponds to "i", and the reference data is denoted by Zi. Examples of the reference data include a history regarding diseases and treatments (reference data in FIG. 5B) corresponding to the feature quantity (reference feature quantity in FIG. 5A) that indicates the tendency of measured blood pressure values and a history regarding purchased products (reference data in FIG. 5B) corresponding to the feature quantity (reference feature quantity in FIG. 5A) that indicates the user location information. In the example in FIG. 5B, histories regarding diseases and treatments, such as a user assigned the identifier ID of 1 having been hospitalized in October, 2013 for a cerebral infarction and a user assigned the identifier of 2 having been started a treatment for diabetes in February, 1999, are accumulated. The reference data may be encrypted before it is stored.

1.3.5 Encrypted Reference Data Extraction Unit

The encrypted reference data extraction unit 204 generates encrypted reference data if the reference similarity value extraction unit 203 determines that the distance matches the similarity value. The encrypted reference data is information obtained by encrypting reference data, which is data corresponding to the reference feature quantity used in calculation of the encrypted distance. The encrypted reference data extraction unit 204 also transmits the generated encrypted reference data to the decryption unit 107 of the user terminal device 100. Specifically, the encrypted reference data extraction unit 204 extracts, from the reference data storage unit 205, reference data corresponding to the identifier ID extracted by the reference similarity value extraction unit 203 and transmits the encrypted reference data to the decryption unit 107 of the user terminal device 100. Before transmitting the reference data, the encrypted reference data extraction unit 204 encrypts the reference data to protect the data on a communication channel. Before performing encryption, the encrypted reference data extraction unit 204 may make the user corresponding to the reference data anonymous to make the user unidentifiable based on the reference data. In addition, the data computation device 200 may derive statistical information, such as an average or a frequency, from a plurality of pieces of extracted reference data and transmit the statistical information to the decryption unit 107 of the user terminal device 100 after encrypting the statistical information.

1.4 Operation of Similarity-Information Search System 1.4.1 Overview of Operation An operation of the similar-information search system 10 will be described with reference to FIG. 6.

Figure 6:
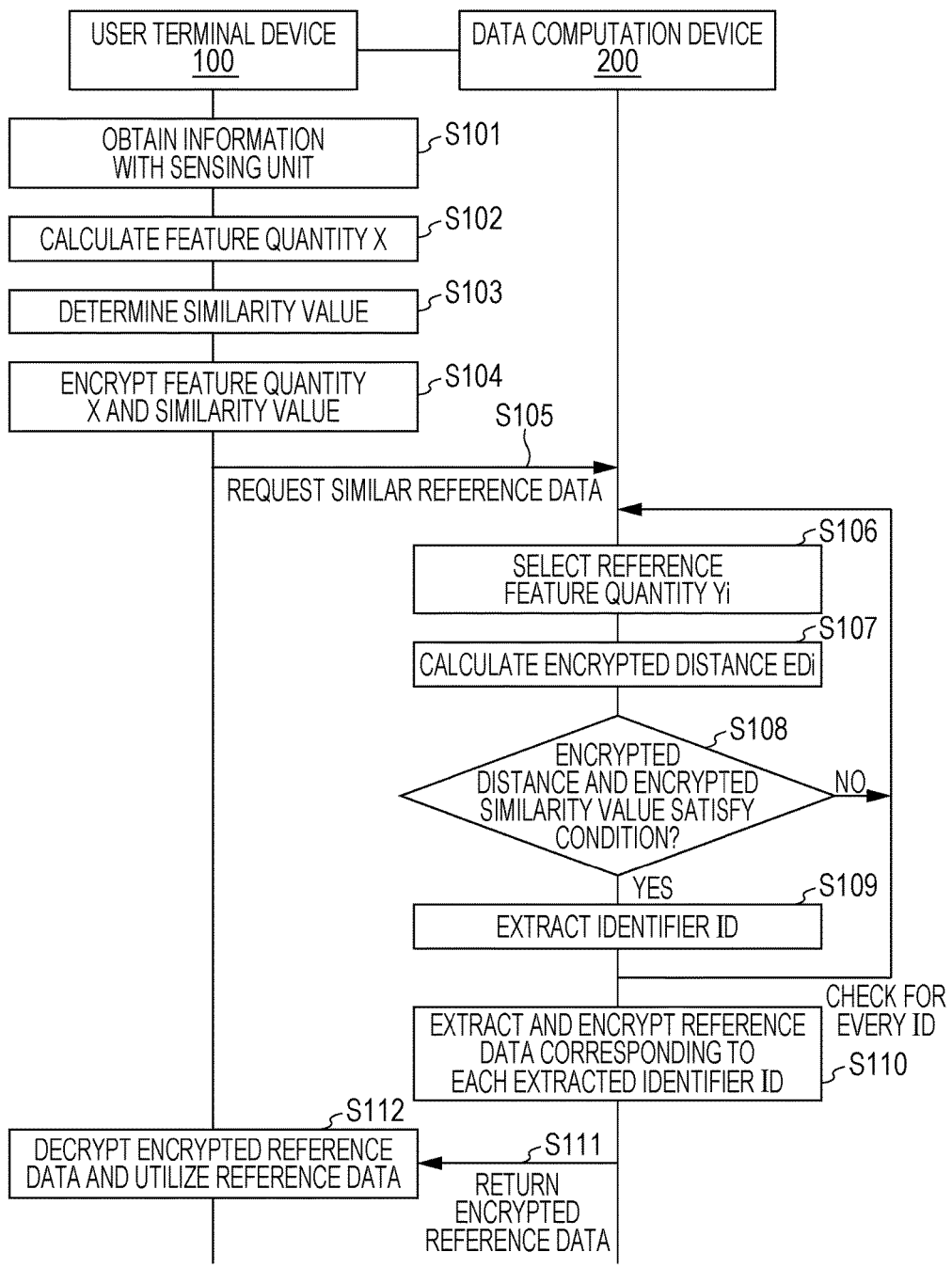
FIG. 6 is a sequence diagram illustrating an operation of the similar-information search system in accordance with the first embodiment.

FIG. 6 is a sequence diagram illustrating an operation of the similar-information search system 10 in accordance with the first embodiment.

As illustrated in FIG. 6, in step S101, the sensing unit 101 of the user terminal device 100 performs sensing on a user and obtains data about the user.

In step S102, the feature quantity calculation unit 102 calculates a feature quantity X from the data obtained by the sensing performed by the sensing unit 101. For example, the feature quantity X may be an m-dimensional vector whose components have following numerical values.

$X=(x1, x2, \ldots, xm)$

In step S103, the similarity value setting unit 104 sets a similarity value that serves as a criterion during a search. For example, in the case where data for which the distance is less than D is searched for, distances $0, 1, 2, \ldots, D-1$ are set as the similarity values.

In step S104, the feature quantity encryption unit 103 encrypts the feature quantity X using the homomorphic encryption scheme to generate an encrypted feature quantity. In addition, the similarity value encryption unit 105 encrypts the similarity value using the homomorphic encryption scheme to generate an encrypted similarity value. The homomorphic encryption scheme is an encryption scheme that makes decryption by the data computation device 200 unsuccessful. The key used during encryption is the public key of the user terminal device 100.

Let Enc denote an encryption function. Then, the encrypted feature quantity is denoted as $Ex=(Enc(x1), Enc(x2), \ldots, Enc(xm))$, and the encrypted similarity values can be denoted as $Enc(0), Enc(1), \ldots, Enc(D-1)$.

In step S105, the user terminal device 100 requests the data computation device 200 to provide similar reference data that satisfies a condition, by providing the encrypted feature quantity and the encrypted similarity value to the data computation device 200. Specifically, the encrypted feature quantity is transmitted to the encrypted distance calculation unit 202, and the encrypted similarity value is transmitted to the reference similarity value extraction unit 203.

Specifically, the encrypted distance calculation unit 202 receives, from the feature quantity encryption unit 103, the encrypted feature quantity that is a feature quantity encrypted using the homomorphic encryption scheme. The reference similarity value extraction unit 203 receives, from the similarity value encryption unit 105, the encrypted similarity value that is information obtained by encrypting the similarity value indicating the degree of similarity. Note that the encrypted similarity value that is the encrypted information is preferably obtained by encryption using the homomorphic encryption scheme.

In addition, a plurality of encrypted similarity values may be received each of which is information obtained by encrypting a corresponding one of a plurality of similarity values indicating a plurality of degrees of similarity.

In step S106, the data computation device 200 selects the reference feature quantity $Yi=(yi1, yi2, \ldots, yim)$ assigned an i-th identifier ID from the reference feature quantity storage unit 201.

In step S107, the encrypted distance calculation unit 202 calculates a distance indicating a degree of similarity between at least one encrypted reference feature quantity, obtained by encrypting at least one of the plurality of reference feature quantities, and the encrypted feature quantity received by the data computation device 200, with the feature quantities kept encrypted. The encrypted reference feature quantity can be denoted as $$Ey=(Enc(yi1), Enc(yi2), \ldots, Enc(yim)).$$

Note that the at least one encrypted reference feature quantity, obtained by encrypting at least one of the plurality of reference feature quantities, is preferably obtained by encryption using the homomorphic encryption scheme.

The encrypted distance calculation unit 202 calculates, by determining differences between the corresponding vector components of the feature quantity X and the reference feature quantity Yi and adding the differences, by using the property of the homomorphic encryption scheme, the encrypted distance EDi denoted as follows:

$$EDi=Enc(|x1-yi1|+|x2-yi2|+ \ldots +|xm-yim|).$$

In the above, the sum of absolute values of differences between the corresponding vector components is used as the encrypted distance. Note that the data computation device 200 may perform step S107 for each of the plurality of encrypted similarity values.

In step S108, the reference similarity value extraction unit 203 checks whether a condition is satisfied by using the encrypted distance and the encrypted similarity value. Specifically, in step S108, it is determined whether the calculated encrypted distance matches the encrypted similarity value received by the data computation device 200. Note that the data computation device 200 may perform step S108 for each of the plurality of encrypted similarity values.

For example, it is checked whether the encrypted distance EDi matches any of the encrypted similarity values Enc(0), Enc(1), . . . , Enc(D−1). If the encrypted distance EDi matches any of the encrypted similarity values, it indicates that content of the encryption function Enc of the encrypted distance EDi, that is, the distance between the feature quantity and the reference feature quantity ($|x1-yi1|+|x2-yi2|+ \ldots +|xm-yim|$) is one of the distances $0, 1, \ldots, D-1$ that serve as the similarity values.

If the encrypted distance EDi matches none of the encrypted similarity values, that is, the condition is not satisfied, the next identifier ID is selected. The process then returns to step S106.

If the encrypted distance EDi matches any of the encrypted similarity values, that is, the condition is satisfied, the reference similarity value extraction unit 203 records the current identifier ID in step S109 because the distance between these feature quantities is smaller than the distance D. Steps S106 to S109 are repeatedly performed for each identifier ID in the reference feature quantity storage unit 201.

If it is determined in S108 that the encrypted distance matches any of the encrypted similarity values, the encrypted reference data extraction unit 204 generates encrypted reference data, which is information obtained by encrypting reference data that is data corresponding to the reference feature quantity used in calculation of the encrypted distance, in step S110. Specifically, in step S110, the encrypted reference data extraction unit 204 extracts, from the reference data storage unit 205, the reference data corresponding to the identifier ID extracted in step S109 and encrypts the reference data by using the public key of the user terminal device 100.

In step S111, the encrypted reference data extraction unit 204 transmits the generated encrypted reference data to the user terminal device 100. Note that the encrypted reference data extraction unit 204 may perform step S111 for each of the plurality of encrypted similarity values.

In step S112, the decryption unit 107 of the user terminal device 100 receives the encrypted reference data from the encrypted reference data extraction unit 204. The decryption unit 107 then decrypts the encrypted reference data received from the data computation device 200, and the reference data utilization unit 106 utilizes the resulting reference data.

1.4.2 Feature Quantity Calculation Example

In the case where image data, such as image data of a face or ultrasound information, is obtained by the sensing unit 101, the feature quantity calculated in step S102 may be, for example, a main component of a characteristic parameter in such image information or a position, area, or width of a certain area. In the case where blood pressure information is obtained, a tendency with respect to the time axis is converted into, for example, a polynomial from a history (not illustrated in FIG. 3) of the measured blood pressure information that has been obtained and stored separately in the user terminal device 100, and a coefficient of the polynomial may be used as the feature quantity. FIG. 9 illustrates an example of the polynomial denoting the tendency with respect to the time axis.

FIG. 9 is a graph illustrating an example of how the feature quantity is calculated with respect to time, which is displayed by the user terminal device 100 in accordance with the first embodiment. In FIG. 9, the horizontal axis illustrates a time period from a past time point (e.g. one year ago) to the present time point. In addition, in FIG. 9, an approximation curve is derived from measured values (denoted by x), and the coefficient of the approximation curve is used as the feature quantity.

1.4.3 Encrypted Distance Calculation Example

In the above, the sum of the differences between the corresponding vector component values of the feature quantity determined by the user terminal device 100 and the reference feature quantity stored in the data computation device 200 is determined as the encrypted distance in step S107, with the feature quantities kept encrypted. The encrypted distance is Euclidean distance between the reference feature quantity and the encrypted feature quantity. Alternatively, for example, a method for calculating a cosine similarity may be used to calculate the encrypted distance. In this case, fully homomorphic encryption that allows both addition and multiplication to be performed with the feature quantities kept encrypted or limited homomorphic encryption for which the number of times of multiplication is limited (somewhat homomorphic encryption) may be used.

1.4.4 Data Exchanged Between User Terminal Device and Data Computation Device

FIG. 7A is a diagram illustrating an example of a data format used by the user terminal device 100 and the data computation device 200 in accordance with the first embodiment. FIG. 7B is a diagram illustrating an example of a data format used by the user terminal device 100 and the data computation device 200 in accordance with the first embodiment. FIGS. 7A and 7B illustrate examples of the format of data exchanged between the user terminal device 100 and the data computation device 200 in steps S105 and S111, respectively. The data format includes fields for an identifier ID of a source, an identifier ID of a destination, a command, and data. Note that when commands are exchanged between the plurality of user terminal devices 100 and the plurality of data computation devices 200 in parallel, an identifier may be added to indicate a correspondence between steps S105 and S111.

1.4.5 Display Example

Figure 8A:
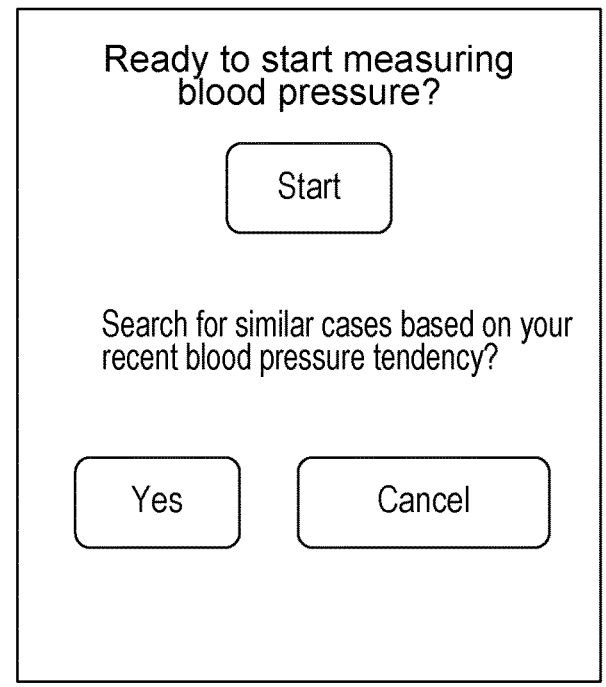
FIG. 8A is a diagram illustrating an example of a screen displayed on the user terminal device in accordance with the first embodiment.
Figure 8B:
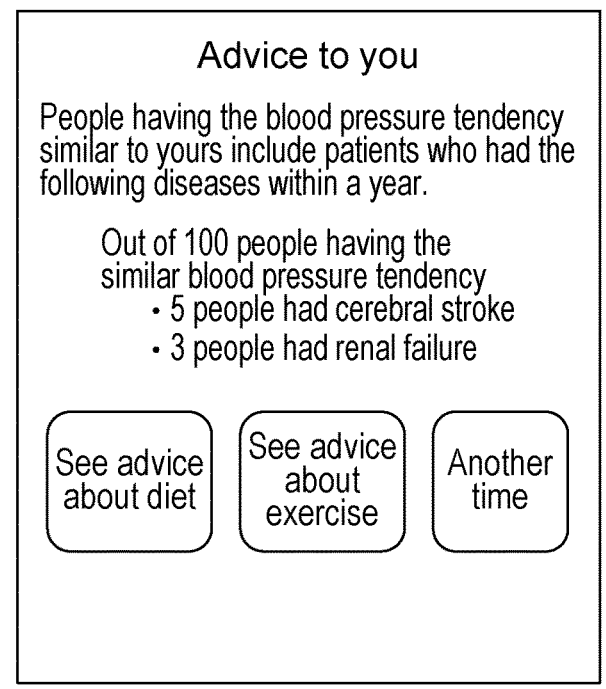
FIG. 8B is a diagram illustrating an example of a screen displayed on the user terminal device in accordance with the first embodiment.

FIG. 8A is a diagram illustrating an example of a screen displayed on the user terminal device 100 in accordance with the first embodiment. FIG. 8B is a diagram illustrating an example of a screen displayed on the user terminal device 100 in accordance with the first embodiment.

FIG. 8A illustrates an example of a screen displayed on the user terminal device 100 in step S101 in FIG. 6. In this example, when the user clicks (selects) "Start", the sensing unit 101 starts measuring blood pressure. Then, the user selects whether to search for similar cases on the basis of their recent blood pressure tendency through "Yes" or "Cancel". If the user clicks "Yes" to show an agreement, the user terminal device 100 calculates the feature quantity from the tendency by using the measurement value and recent log information. If the user clicks "Cancel" to show a disagreement, the user terminal device 100 does not transmit information used to search for similar cases to the data computation device 200.

FIG. 8B illustrates an example of a screen displayed when advice about diet and exercise is provided to the user by using the retrieved similar reference data. In this case, the similar reference data denotes diseases which users having a similar blood pressure change tendency have had later. In this example, the user terminal device 100 displays the tendency of the blood pressure from the past time point to the present time point on the basis of the information about the user and displays the similar reference data. Since the user terminal device 100 provides advice based on the information about user, the advice is more convincing and valuable for the user.

1.5 Advantageous Effects of First Embodiment

In the first embodiment, the data computation device 200 receives the encrypted feature quantity and the encrypted similarity value from the user terminal device 100, and the encrypted reference data extraction unit 204 extracts encrypted reference data. Since the data computation device 200 extracts and transmits, to the user terminal device 100, only the encrypted reference data that satisfies the similarity value smaller than D, an amount of calculation performed by the user terminal device 100 and an amount of communications performed between the data computation device 200 and the user terminal device 100 can be reduced. In addition, the user terminal device 100 can flexibly set the similarity value in accordance with a user's desire.

In addition, since the encrypted feature quantity is obtained by encryption using a homomorphic encryption scheme, the data computation device 200 is unable to decrypt the encrypted feature quantity. For this reason, this similar-information search method or the like can enhance the confidentiality of information searched for by the user during transmission from the user terminal device 100 to the data computation device 200 and in the data computation device 200.

Second Embodiment

A similar-information search system relating to the present disclosure will now be described as a second embodiment of the present disclosure with reference to the drawings. Differences between the second embodiment and the first embodiment are as follows. In the first embodiment, the reference similarity value extraction unit 203 determines whether a condition is satisfied depending on whether the encrypted distance matches the encrypted similarity value in step S108. The assumption of this is the use of a deterministic encryption scheme for which, if original pieces of data are the same, their encrypted pieces of data also match. In contrast, in the second embodiment, a probabilistic encryption scheme is used for which a random number is generated at the time of encryption and data including the random number is encrypted, so that the encrypted pieces of data do not necessarily have the same value even if the original pieces of data are the same. The use of the probabilistic encryption scheme makes an analysis based on a frequency in ciphertexts more difficult and can enhance the security. On the other hand, if a random number is used at the time of encryption in the deterministic encryption scheme of the first embodiment, the determination as to whether the encrypted distance matches the encrypted similarity value can no longer be performed.

In the second embodiment, a description will be given of a method that makes it possible to perform computation for a similar-information search on encrypted information when the probabilistic encryption scheme is used. In the similar-information search system, the user terminal device 100 converts a key for decryption and provides the converted key to the data computation device 200, and the data computation device 200 obtains a converted distance by decryption. Then, in the similar-information search system, a component of the random number is removed by decryption. Thus, it can be determined whether the converted distance matches the converted similarity value. In addition, since the key for decryption is converted by using a one-way function, the data computation device 200 is unable to determine the key. Hereinafter, the differences between the second embodiment and the first embodiment will be mainly described, and each configuration of the second embodiment that is substantially the same as that of the first embodiment is denoted by the same reference sign, and a detailed description about such a configuration is omitted.

2.1 User Terminal Device

Figure 10:
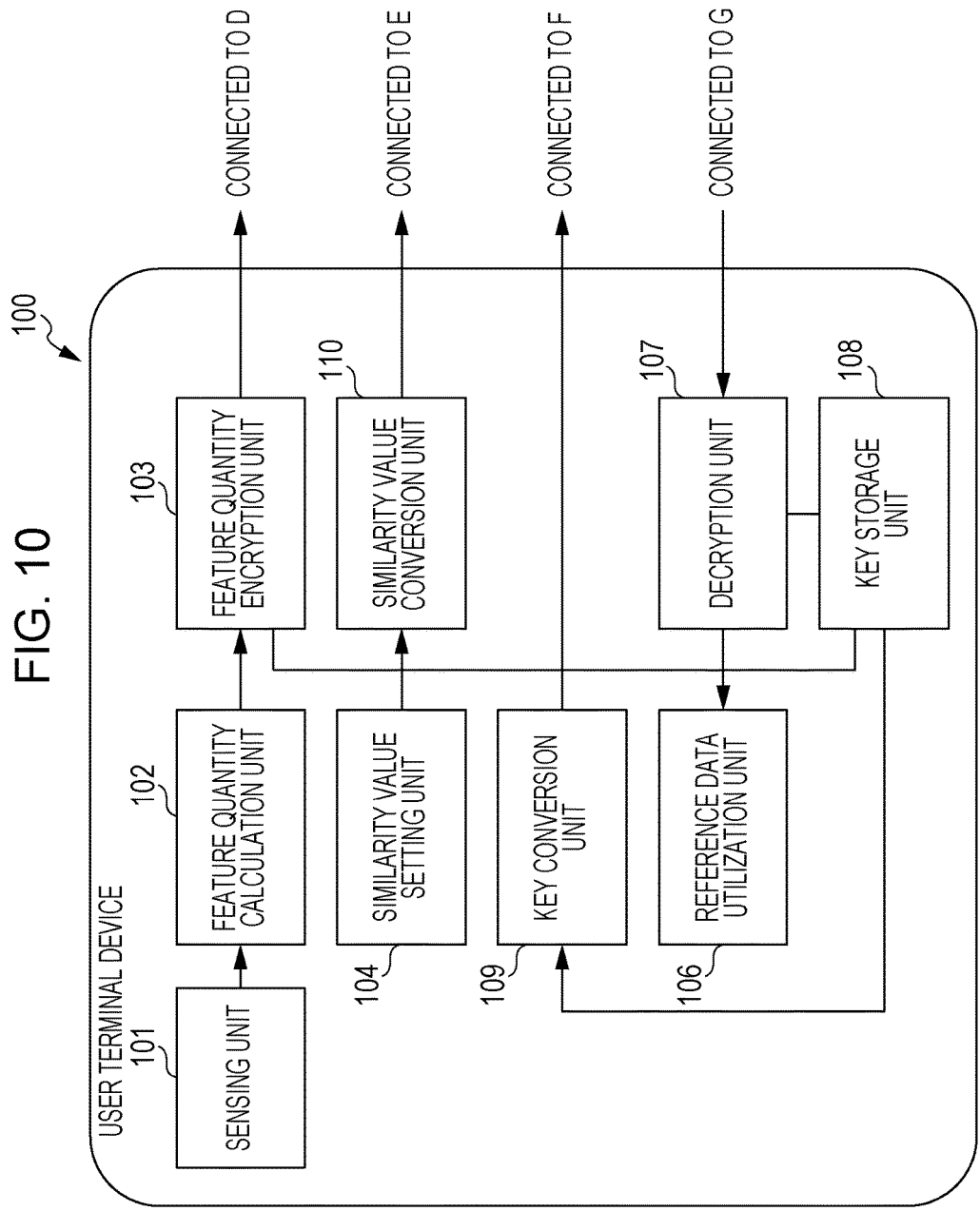
FIG. 10 is a block diagram illustrating a configuration of a user terminal device in accordance with a second embodiment.

FIG. 10 is a block diagram illustrating a configuration of the user terminal device 100 in accordance with the second embodiment.

As illustrated in FIG. 10, the user terminal device 100 includes a similarity value conversion unit 110 in place of the similarity value encryption unit 105 and further includes a key conversion unit 109 in addition to the components of the first embodiment except for the similarity value encryption unit 105. Note that components, in the block diagram of FIG. 10, that are denoted by the same reference signs as those used in FIG. 3 have substantially the same functions as those in FIG. 3, and thus a description thereof is omitted. It is assumed that the feature quantity encryption unit 103, the similarity value conversion unit 110, the key conversion unit 109, and the decryption unit 107 in FIG. 10 are connected to corresponding components (indicated by D, E, F, and G, respectively) of the data computation device 200 illustrated in FIG. 11.

2.1.1 Key Conversion Unit

The key conversion unit 109 calculates a converted key value. The converted key value is information obtained by converting a secret key of the user terminal device 100 by using a one-way function. Examples of the one-way function include exponentiation in which the secret key is used as the exponent. Conversion using a one-way function indicates that it is easy to perform exponentiation using the secret key but it is difficult to do the opposite, that is, to determine the exponent from the result of exponentiation. Determining the exponent from the result of exponentiation ultimately equates to a fact that a logarithmic operation in a discrete logarithmic domain is difficult.

2.1.2 Similarity Value Conversion Unit

The similarity value conversion unit 110 converts the set similarity value by using the same one-way function as that used by the key conversion unit 109.

2.2 Data Computation Device

Figure 11:
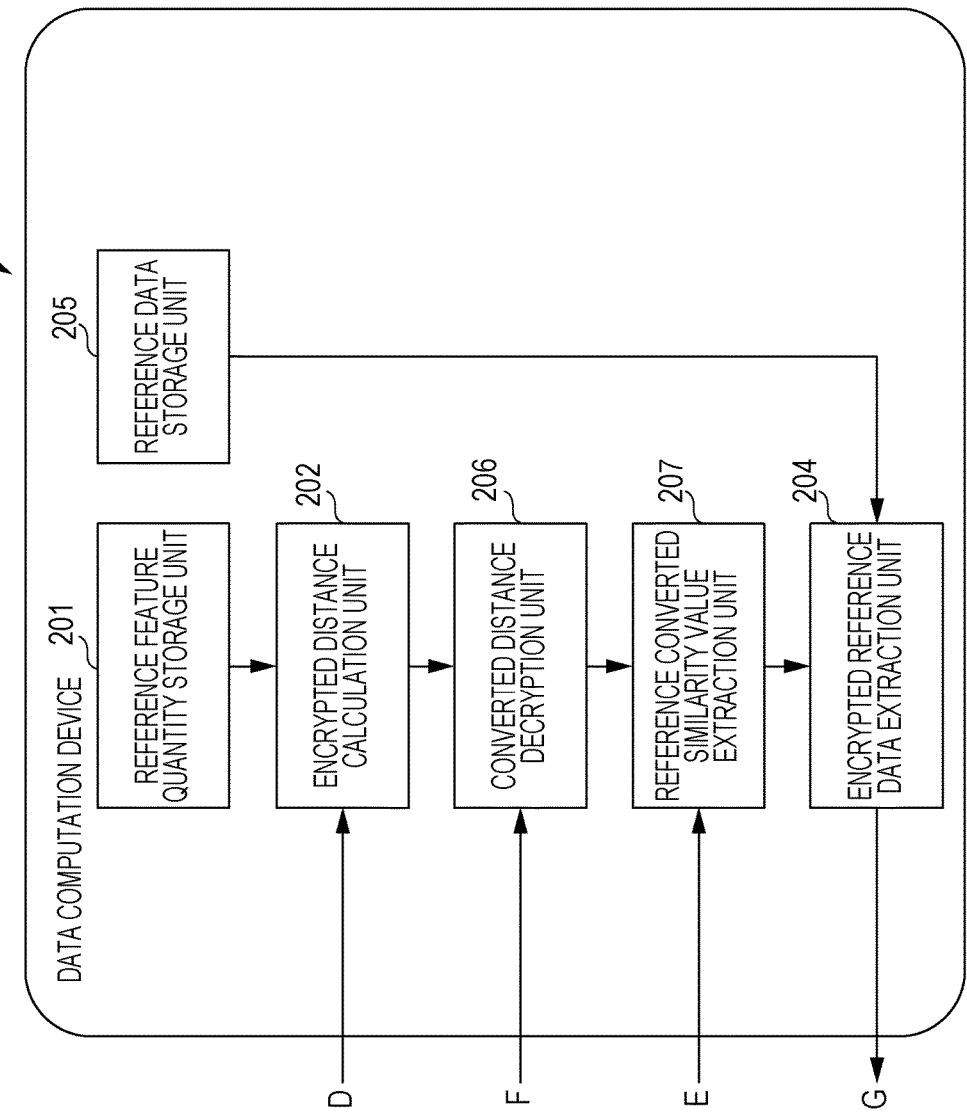
FIG. 11 is a block diagram illustrating a configuration of a data computation device in accordance with the second embodiment.

FIG. 11 is a block diagram illustrating a configuration of the data computation device 200 in accordance with the second embodiment.

As illustrated in FIG. 11, the data computation device 200 includes a reference converted similarity value extraction unit 207 in place of the reference similarity value extraction unit 203 of the first embodiment and further includes a converted distance decryption unit 206 in addition to the components of the first embodiment except for the reference similarity value extraction unit 203. Note that components, in the block diagram of FIG. 11, that are denoted by the same reference signs as those used in FIG. 4 have substantially the same functions as those in FIG. 4, and thus a description thereof is omitted. It is assumed that D, E, F, and G in FIG. 11 are connected to the corresponding components illustrated in FIG. 10.

2.2.1 Converted Distance Decryption Unit

The converted distance decryption unit 206 determines a converted distance by decrypting an encrypted distance by using the converted key value, which is information obtained as a result of the key conversion unit 109 converting the secret key of the user terminal device 100 by using a one-way function in a transform domain. Since the homomorphic encryption scheme used in the second embodiment is probabilistic, the encrypted distance contains a random number component. However, the random number component is no longer contained in the converted distance obtained by decryption using the converted key value.

2.2.2 Reference Converted Similarity Value Extraction Unit

The reference converted similarity value extraction unit 207 determines whether the converted distance matches the converted similarity value in the transform domain. If the converted distance matches any of converted similarity values, the reference converted similarity value extraction unit 207 determines that the converted distance satisfies a condition for the set converted similarity value and extracts the corresponding identifier ID. If the converted distance matches none of the converted similarity values, the reference converted similarity value extraction unit 207 does not extract the identifier ID.

2.3 Operation of Similarity-Information Search System

An operation of the similar-information search system 10 according to the second embodiment will be described with reference to a sequence diagram illustrated in FIG. 12.

Figure 12:
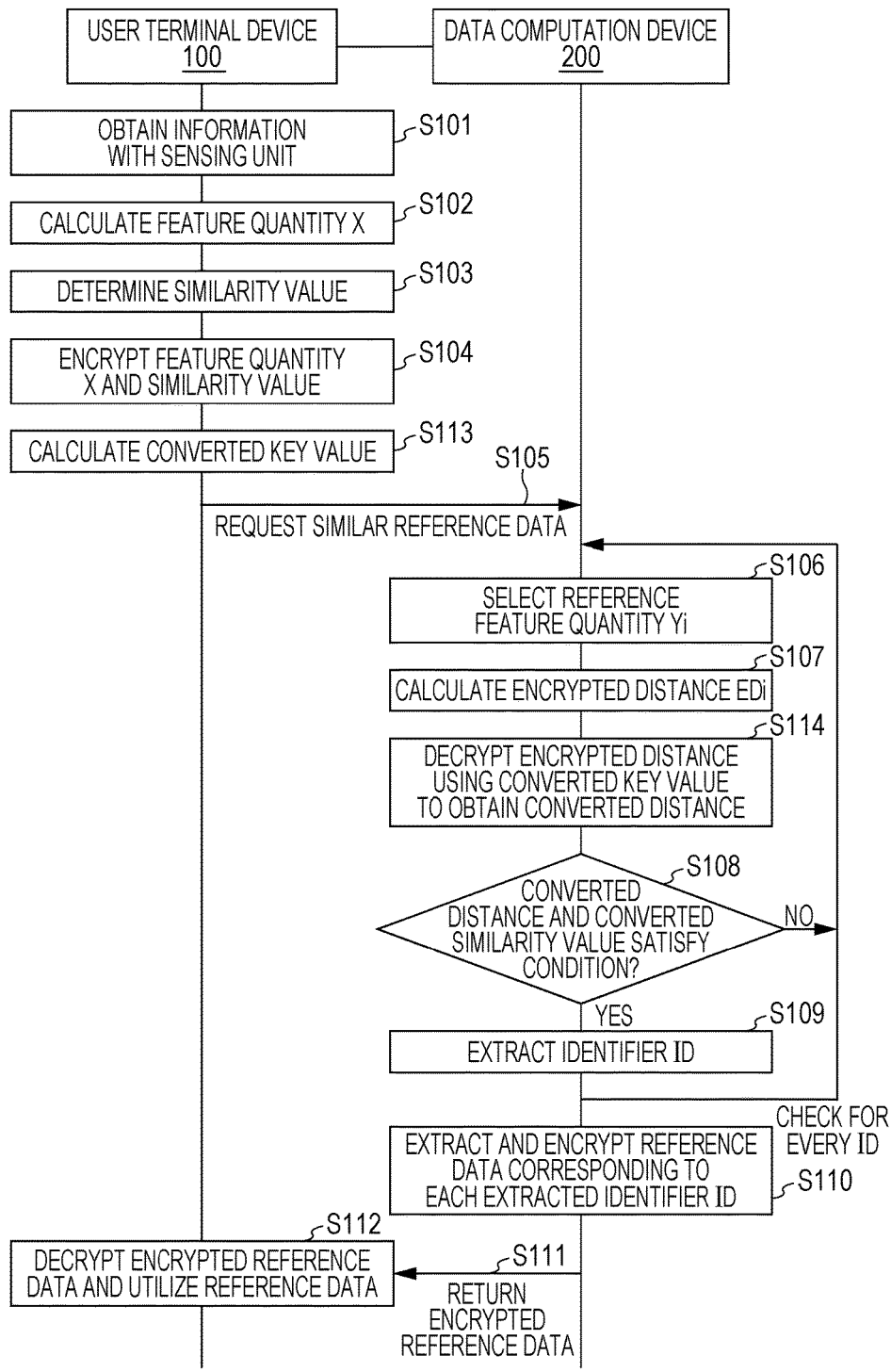
FIG. 12 is a sequence diagram illustrating an operation of a similar-information search system in accordance with the second embodiment.

FIG. 12 is a sequence diagram illustrating the operation of the similar-information search system 10 in accordance with the second embodiment.

As illustrated in FIG. 12, in step S101, the sensing unit 101 of the user terminal device 100 performs sensing on a user and obtains data about the user.

In step S102, the feature quantity calculation unit 102 calculates a feature quantity X from the information obtained by the sensing performed by the sensing unit 101. For example, the feature quantity X may be an m-dimensional vector whose components have following numerical values.

$$X=(x1,x2,\ldots,xm)$$

In step S103, the similarity value setting unit 104 sets a similarity value that serves as a criterion during a search. For example, in the case where data for which the distance is less than D is searched for, distances $0, 1, 2, \ldots, D-1$ are set as the similarity values.

In step S104, the feature quantity encryption unit 103 encrypts the feature quantity X by using the homomorphic encryption scheme to generate an encrypted feature quantity. In addition, the similarity value conversion unit 110 determines a one-way function value of the similarity value. Specifically, the similarity value conversion unit 110 converts the similarity value by using the homomorphic encryption scheme to generate a converted similarity value. The homomorphic encryption scheme is an encryption scheme that makes decryption by the data computation device 200 unsuccessful. The key used during encryption is the public key of the user terminal device 100. Unlike the first embodiment, the homomorphic encryption scheme is a probabilistic encryption scheme containing a random number component in the second embodiment.

Let Enc1 denote an encryption function. Then, the encrypted feature quantity is denoted as $$E1x=(Enc1(x1),Enc1(x2),\ldots,Enc1(xm)).$$

Let "F" denote a one-way function used to convert the similarity value. Then, the converted similarity values can be denoted as $$F(0),F(1),\ldots,F(D-1).$$

In step S113, the key conversion unit 109 calculates a converted key value F(s), which is information obtained by converting a secret key s of the user terminal device 100 by using a certain function. The certain function is a one-way function. The key conversion unit 109 calculates the converted key value, which is a result of computation using the secret key s (e.g., result of exponentiation in which s is used as the exponent) when necessary.

In step S105, the user terminal device 100 requests the data computation device 200 to provide similar reference data that satisfies a condition, by providing the encrypted feature quantity, the converted similarity value, and the converted key value to the data computation device 200. That is, the user terminal device 100 transmits the encrypted feature quantity, the converted similarity value, and the converted key value to the data computation device 200, and the data computation device 200 receives these pieces of information.

Specifically, the feature quantity encryption unit 103 transmits the encrypted feature quantity to the encrypted distance calculation unit 202, and the encrypted distance calculation unit 202 receives the encrypted feature quantity. In addition, the similarity value conversion unit 110 transmits the converted similarity value to the reference converted similarity value extraction unit 207, and the reference converted similarity value extraction unit 207 receives the converted similarity value. Further, the key conversion unit 109 transmits the converted key value to the converted distance decryption unit 206, and the converted distance decryption unit 206 receives the converted key value.

In addition, in step S105, the data computation device 200 may receive, as encrypted similarity values, a plurality of converted similarity values, which are obtained by encrypting a plurality of similarity values indicating a plurality of degrees of similarity by using a one-way function.

In step S106, the data computation device 200 selects the reference feature quantity $Yi=(yi1, yi2, \ldots, yim)$ assigned an i-th identifier ID from the reference feature quantity storage unit 201.

In step S107, the encrypted distance calculation unit 202 calculates a distance between the reference feature quantity encrypted using the encryption function Enc1 and the encrypted feature quantity, with the feature quantities kept encrypted. The encrypted reference feature quantity can be denoted as $$E1y = (Enc1(yi1), Enc1(yi2), \ldots, Enc1(yim)).$$

By using this equation, the encrypted distance calculation unit 202 can calculate, by determining differences between the corresponding vector components of the feature quantity X and the reference feature quantity Yi and adding the differences, by using the property of the homomorphic encryption scheme, the encrypted distance ED1 i denoted as follows:

$$ED1i = Enc1(|x1-yi1|+|x2-yi2|+\ldots+|xm-yim|).$$

In the above, the sum of absolute values of differences between the corresponding vector components is used as the distance.

In step S114, the converted distance decryption unit 206 decrypts the encrypted distance by using the converted key value in the transform domain. As a result of the decryption, $$F(|x1-yi1|+|x2-yi2|+\ldots+|xm-yim|)$$

is determined. This value is referred to as the converted distance. Note that the encrypted distance ED1 i contains a random number generated at the time of encryption, and the outputs of the encryption function Enc1 do not necessarily match even if inputs are the same. In contrast, outputs of the one-way function F match if inputs are the same.

In step S108, the converted distance decryption unit 206 generates a converted distance by decrypting the encrypted distance by using the converted key value. In addition, the reference converted similarity value extraction unit 207 determines whether the generated converted distance matches the converted similarity value. Specifically, the reference converted similarity value extraction unit 207 determines whether the converted distance matches any of the converted similarity values $F(0), F(1), \ldots, F(D-1)$. If the converted distance matches any of the converted similarity values $F(0), F(1), \ldots, F(D-1)$, it indicates that content of the one-way function F, that is, the distance between the feature quantity and the reference feature quantity ($|x1-yi1|+|x2-yi2|+\ldots+|xm-yim|$) is any of the distances $0, 1, \ldots, D-1$.

If the converted distance matches none of the converted similarity values $F(0), F(1), \ldots, F(D-1)$, the reference converted similarity value extraction unit 207 selects the next identifier ID, and the process returns to step S106.

If the converted distance matches any of the converted similarity values, the reference converted similarity value extraction unit 207 records the current identifier ID in step S109. Then, steps S106 to S109 are repeatedly performed for each identifier ID in the reference feature quantity storage unit 201.

In step S110, the encrypted reference data extraction unit 204 extracts reference data corresponding to each of the identifiers IDs extracted in step S109 from the reference data storage unit 205 and encrypts the reference data by using the public key of the user terminal device 100. Specifically, if it is determined in step S108 that the converted distance matches the converted similarity value, the encrypted reference data extraction unit 204 generates encrypted reference data, which is information obtained by encrypting reference data that is data corresponding to the reference feature quantity used in calculation of the encrypted distance.

In step S111, the encrypted reference data extraction unit 204 transmits the generated encrypted reference data to the user terminal device 100.

In step S112, the decryption unit 107 receives, from the data computation device 200, the encrypted reference data, which is information obtained by encrypting reference data that is obtained based on the encrypted feature quantity and the encrypted similarity value. The decryption unit 107 then decrypts the encrypted reference data that is transmitted from the encrypted reference data extraction unit 204 and is a result of the similar-information search, and the reference data utilization unit 106 utilizes the resulting reference data.

2.3.1 Specific Calculation Example for Ring Learning with Errors (LWE)

As a specific example of the encryption function Enc1, key generation, encryption, decryption, and multiplication of ciphertexts in a homomorphic encryption scheme using ring LWE will be described below. Ring LWE is described in chapter 13 of Shigeo Mitsunari, "Kuraudo wo Sasaeru Korekara no Ango Gijutsu (Applied Cryptography for the Cloud)", Mar. 24, 2015, github.

Key generation: Rings R and Rp are formed by using n, which is a power to 2, and p, which is a prime number for which $p-1$ is a multiple of 2n. Let t denote a prime number smaller than p and $Rt=(Z/tZ)[x]/(x^n+1)$ be a plaintext space. Here, Z denotes an integer, and Rt denotes a residue field obtained by dividing by $(x^n+1)$ a polynomial whose coefficient is an integer smaller than or equal to t. In addition, the secret key s and e are arbitrarily selected, and a1 is arbitrarily selected from Rp. The public key is denoted by $(a0=-(a1 \times s + t \times e), a1)$.

Encryption: A plaintext m ($\in Rt$) is encrypted by using the public key (a0, a1) in a manner as follows:

$$Enc1(m) = (m + a0 \times e1 + t \times e3, a1 \times e1 + t \times e2),$$

where e1, e2, and e3 are arbitrarily selected.

Decryption: A ciphertext $c=(c0, c1, \ldots, ck)$ is decrypted by using the secret key s in a manner as follows:

$$Dec1(c) = c0 \times s^0 + c1 \times s^1 + c2 \times s^2 + \ldots + ck \times s^k (\in Rq).$$

$Dec1(c)$ is $m + t \times e4$ (where, $|t \times e4| < p/2$).

Multiplication of ciphertexts: The product of the ciphertext $c=(c0, c1, \ldots, ck)$ and a ciphertext $d=(d0, d1, \ldots, dl)$ is denoted as $h=(h0, h1, \ldots, hk+1)$.

Here, hi is determined using $$\Sigma c_j \times d_{i-j} = c0 \times di + c1 \times d_{i-1} + \ldots + ci \times d0.$$

Addition of ciphertexts: The sum of the ciphertext $c=(c0, c1, \ldots, ck)$ and the ciphertext $d=(d0, d1, \ldots, dl)$ is determined by padding 0 to the shorter vector to make the lengths equal and then adding the corresponding components.

Specific calculations performed in the sequence illustrated in FIG. 12 will be described below using the encryption function Enc1 described above.

The encrypted feature quantity and the converted similarity values obtained in step S104 are respectively denoted as $$E1x=(Enc1(x1), Enc1(x2), \ldots, Enc1(xm)), \text{ and}$$

$$F(0)=r^{\wedge}0, F(1)=r^{\wedge}1, \ldots, F(D-1)=r^{\wedge}D-1,$$

where r is an arbitrary random number.

In step S113, the key conversion unit 109 determines the converted key value F(s) as follows:

$$F(s)=r^{\wedge}s, F(s^{\wedge}2)=r^{\wedge}(s^{\wedge}2), \ldots, F(s^{\wedge}k)=r^{\wedge}(s^{\wedge}k).$$

The encrypted reference feature quantity obtained in in step S106 is as follows:

$$E1y=(Enc1(y1), Enc1(y2), \ldots, Enc1(ym)).$$

In step S107, the encrypted distance calculation unit 202 determines the encrypted distance ED1 i by using the encrypted feature quantity E1x and the encrypted reference feature quantity E1y. Based on the homomorphic property of the encryption function Enc1 in terms of addition and multiplication, $$ED1i=Enc1(\text{distance between the feature quantity } X \text{ and the reference feature quantity } Yi)$$

is determined. Here, let the encrypted distance ED1 i be (c0, c1, \ldots, ck).

In step S114, the converted distance decryption unit 206 performs, by using the encrypted distance ED1 i and the converted key value F(s), the following calculation.

$$r^{\wedge}c0+F(s)^{\wedge}c1+\ldots+F(s^{\wedge}k)^{\wedge}ck$$

From the above, this value is equal to $r^{\wedge}Dec1(ED1i)$. Dec1(ED1i), which is an exponent of this calculated value, is the distance between the feature quantity X and the reference feature quantity Yi.

In step S108, the value determined above is compared with each of the converted similarity values $F(0)=r^{\wedge}0, F(1)=r^{\wedge}1, \ldots, F(D-1)=r^{\wedge}(D-1)$ (to determine whether they match). If the converted distance matches the converted similarity value, the distance between the feature quantity X and the reference feature quantity Yi is any of the distances 0 to (D−1). Thus, it is determined that the reference feature quantity satisfies the similarity condition. For the one-way function used to determine a power of r, outputs of the one-way function for different inputs may match (called collision) in some cases. However, it is assumed herein that such cases are ignorable in terms of probabilities.

2.3.2 Specific Calculation Example for Boneh-Goh-Nissim Cryptosystem (BGN Cryptosystem)

As another specific example of the encryption function Enc1, key generation, encryption, decryption, and multiplication of ciphertexts in BGN cryptosystem will be described below. BGN cryptosystem is described in D.Boneh, E.-J.Goh, K.Nissim, "Evaluating 2-DNF Formulas on Ciphertexts", TCC05, 2005.

Key generation: $N=q1 \times q2$ is determined, where each of q1 and q2 is a prime number. Let each of G and G' be a finite cyclic group of order of N, and a generator g of G and $h=u^{\wedge}q2$ (here, u is the generator of G) are generated. In addition, e denotes pairing of $G \times G \rightarrow G'$. Pairing is a function for which $e(u^{\wedge}a, v^{\wedge}b)=e(u,v)^{\wedge}(ab)$ holds for arbitrary $u, v \in G$ and $a, b \in$ integers.

Among the values above, q1 is the secret key, and (N, e, g, h) is the public key.

Encryption: A plaintext $m \in \{0, 1, \ldots, T\}$ (T<q2) (this plaintext space is a space where a discrete logarithm problem can be solved) is encrypted by using the public key (N, e, g, h) in the following manner. The resulting ciphertext is denoted as $$Enc1(m)=(g^{\wedge}m) \times (h^{\wedge}r)=c,$$

where r is an arbitrarily selected random number.

Decryption: The ciphertext c is decrypted by using the secret key q1 in the following manner.

$$Dec1(c) = c^{\wedge}q1$$

$$Dec1(c) = (g^{\wedge}m)^{\wedge}q1 \times (h^{\wedge}r)^{\wedge}q1$$

$$= (g^{\wedge}q1)^{\wedge}m \times u^{\wedge}(Nr)$$

$$= (g^{\wedge}q1)^{\wedge}m$$

The discrete logarithm problem is solved for this equation to decrypt m.

Multiplication of ciphertexts: The multiplication homomorphic property is satisfied between the ciphertext E(m1) of m1 and the ciphertext E(m2) of m2 only once, and g1=e(g, g) and h1=e(g, h) hold.

If $u=g^{\wedge}\alpha$, $h=u^{\wedge}q2=g^{\wedge}\alpha q2$ is obtained. At that time, a ciphertext for m1m2 can be created from E1(m) and E1(m2) in the following manner.

$$E1(m1)=(g^{\wedge}m1) \times (h^{\wedge}r1)$$

$$E1(m2)=(g^{\wedge}m2) \times (h^{\wedge}r2)$$

$$e(E1(m1), E1(m2))h1^{\wedge}r=(g1^{\wedge}(m1m2))h1^{\wedge}r3 \in G'$$

Here, $r3=m1r2+r2m1+\alpha q2 r1 r2+r$ is obtained.

Addition of ciphertexts: The following addition homomorphic property is satisfied between the ciphertext E1(m1) of m1 and the ciphertext E1(m2) of m2. That is, ciphertext for m1+m2 can be created from the ciphertext E1(m1) and the ciphertext E1(m2).

$$E1(m1) \times E1(m2)=(g^{\wedge}(m1+m2)) \times h^{\wedge}(r1+r2)=E1(m1+m2).$$

Specific calculations performed in the sequence illustrated in FIG. 12 will be described below using the encryption function Enc1 described above.

The encrypted feature quantity and the converted similarity values obtained in step S104 are respectively denoted as $$E1x=(Enc1(x1), Enc1(x2), \ldots, Enc1(xm)), \text{ and}$$

$$F(0)=g1^{\wedge}Q, F(1)=g1^{\wedge}2Q, \ldots, F(D-1)=g1^{\wedge}((D-1)Q),$$

where r is an arbitrary random number.

In step S113, the key conversion unit 109 generates an arbitrary random number R and determines the converted key value F(s), which is denoted as $$F(s) = R \times q1 = Q.$$

The encrypted reference feature quantity obtained in step S106 is denoted as follows:

$$E1y = (Enc1(y1), Enc1(y2), \ldots, Enc1(ym)).$$

In step S107, the encrypted distance calculation unit 202 determines the encrypted distance ED1i by using the encrypted feature quantity E1x and the encrypted reference feature quantity E1y. Based on the homomorphic property of the encryption function Enc1 in terms of addition and multiplication, an equation $$ED1i = Enc1(\text{distance between } x \text{ and } y)$$

is satisfied. Note that the distance between x and y may be, for example, a difference therebetween or a cosine similarity (x1y1+x2y2+ . . . +xmym) by using the multiplication homomorphic property that holds only once.

Note that ED1 i takes a form of (g1^(distance between x and y))×(h^r4) and contains a random number component.

In step S114, the following calculation is performed by using the encrypted distance ED1i and the converted key value.

$$(ED1i)^\wedge F(s) = ((g1^\wedge(\text{distance between } x \text{ and } y)) \times (h^\wedge r4))^\wedge (R \times q1) = (g1^\wedge(\text{distance between } x \text{ and } y))^\wedge Q = (g1^\wedge Q)^\wedge (\text{distance between } x \text{ and } y)$$

In step S108, the converted distance decryption unit 206 compares the value determined above with each of the converted similarity values F(0)=g1^Q, F(1)=g1^(2Q), . . . , F(D−1)=g1^((D−1)Q). If the converted distance matches any of the converted similarity values, the distance between the feature quantity X and the reference feature quantity Yi is any of 0 to (D−1). Thus, it is determined that the reference feature quantity satisfies the similarity condition.

2.4 Advantageous Effects of Second Embodiment

In the second embodiment, since the user terminal device 100 transmits data to the data computation device 200 by using probabilistic encryption containing a random number, the security can be enhanced. In addition, the data computation device 200 receives the encrypted feature quantity, the encrypted similarity value, and the converted key value from the user terminal device 100 and extracts encrypted reference data. Since the data computation device 200 extracts only similar data that satisfies the similarity value less than D and transmits the similar data to the user terminal device 100, an amount of calculation performed by the user terminal device 100 and an amount of communications performed between the data computation device 200 and the user terminal device 100 can be reduced. In addition, the user terminal device 100 can flexibly set the similarity value in accordance with a user's desire.

With the probabilistic encryption containing a random number, the encrypted feature quantities do not necessarily have the same value even if the user performs a search using the same information. Accordingly, this similarity-information search method or the like can enhance the confidentiality of the information searched for by the user during transmission from the user terminal device 100 to the data computation device 200 and in the data computation device 200. As a result, the use of the probabilistic encryption makes an analysis based on a frequency in ciphertexts more difficult and can enhance the security.

Modifications

While the present disclosure has been described on the basis of the first and second embodiments, it is obvious that the present disclosure is not limited to the first and second embodiments. The following cases are also included in the present disclosure.

(1) The description has been given on the assumption that the feature quantity is a vector in the first and second embodiments; however, the feature quantity may be a numerical value. In addition, this numerical value may be mapped.

(2) Consecutive values smaller than D are set as the similarity values in the first and second embodiments; however, for example, a value indicating complete matching (that is, zero) or discrete values may be set as the similarity values.

Figure 13:
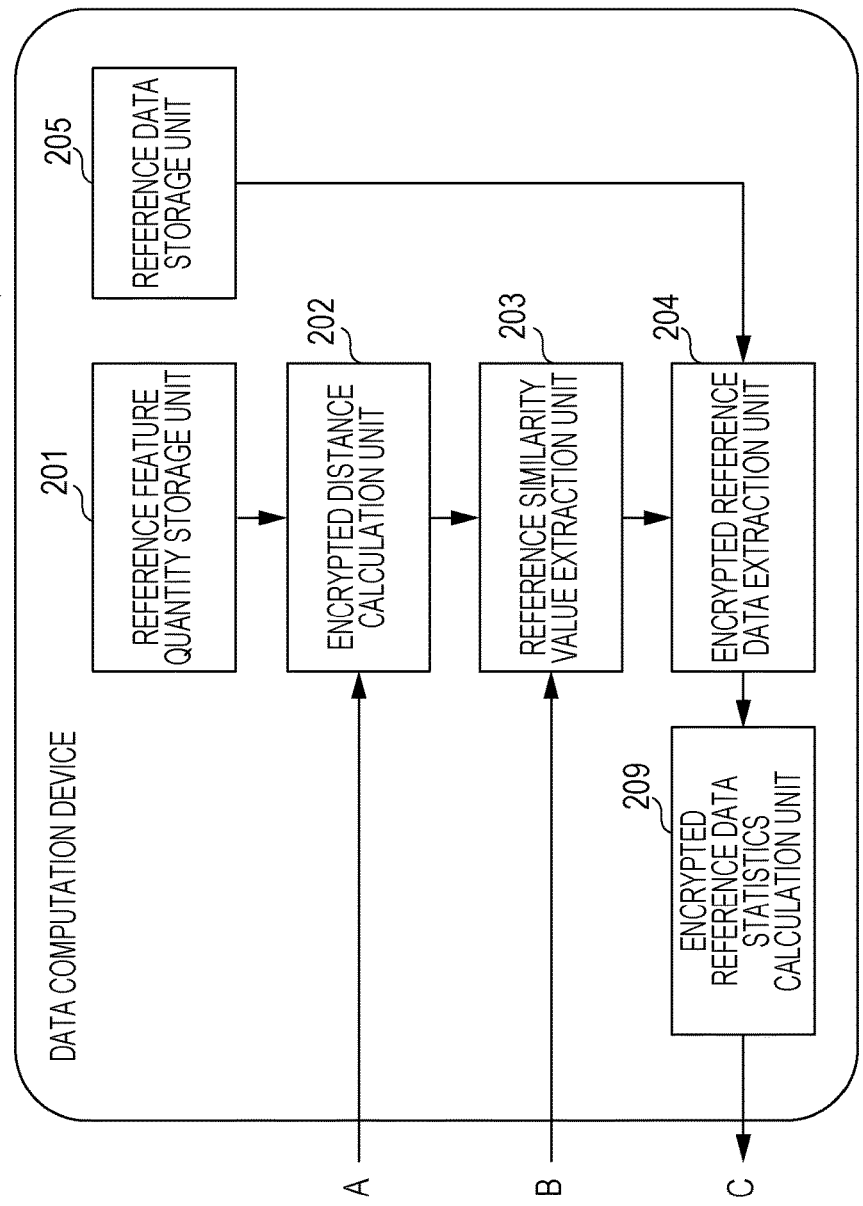
FIG. 13 is a block diagram illustrating a configuration of a data computation device in the case where statistical reference data is obtained in accordance with a modification.

(3) FIG. 13 is a block diagram illustrating a configuration of the data computation device 200 in the case where statistical reference data is obtained in accordance with a modification.

As illustrated in FIG. 13, the data computation device 200 additionally includes an encrypted reference data statistics calculation unit 209 that determines a statistical value. In the first and second embodiments, the data computation device 200 transmits the reference data to the user terminal device 100 after encrypting the reference data; however, the data computation device 200 may derive frequency information or a statistical value, for example, an average or a variance from the reference data and transmit the frequency information or the statistical value to the user terminal device 100. In this case, providing the statistical value instead of raw reference data to the user terminal device 100 makes it difficult to identify the user who owns the reference data even if the reference data leaks to the outside. Accordingly, in this configuration, privacy protection is enhanced.

(4) In the first and second embodiments, plaintext data is stored in the reference feature quantity storage unit 201 and the reference data storage unit 205 of the data computation device 200; however, the data may be encrypted. In this case, the data can be used by extracting the data from the reference data storage unit 205 and decrypting the data. As a result, the security is enhanced. In addition, the data computation device 200 may store data that is encrypted by using the public key of the user terminal device 100. In this case, the reference data can be used in calculation of the encrypted distance or transmitted to the user terminal device 100 without processing the reference data.

(5) In the first and second embodiments, the public key and the secret key of the user terminal device 100 are stored in the key storage unit 108; however, the public key and the secret key may be stored on another medium that is separate from the user terminal device 100 and is attachable to the user terminal device 100 when the user utilizes the user terminal device 100, for example.

(6) In the first and second embodiments, the public key and the secret key of the user terminal device 100 are keys of the user terminal device 100; however, keys for each user may be stored in the key storage unit 108. In this case, authentication is performed between the user and the user terminal device 100. If the authentication is successful, the key corresponding to the user can be selected from the key storage unit 108 and utilized. In this case, in the example data format illustrated in FIGS. 7A and 7B, an identifier ID of the user is used in place of the identifier ID of the user terminal device 100.

(7) In the first and second embodiments, the feature quantity calculation unit 102 may include therein a database, accumulate, for each user, information obtained by sensing, and calculate a feature quantity from information obtained by sensing in the past. In this case, the user may be identified as a result of the user inputting their identifier ID and the user terminal device 100 authenticating the user, for example.

(8) In the first and second embodiments, the feature quantity calculation unit 102 of the user terminal device 100 may obtain, from a database in another medium, information obtained by sensing in the past and calculate the feature quantity. In this case, the identifier ID of the user may be stored on the other medium, and the user terminal device 100 may read it.

(9) In the first and second embodiments, the data computation device 200 searches for reference data (for example, a medical history or treatment history in this case) of users who have the similar tendency on the basis of a feature quantity of the vital signs, such as blood pressure; however, the feature quantity and the reference data are not limited to this type of data. For example, a feature quantity may be calculated from data indicating a range of activities by using a global positioning system (GPS), and reference data (for example, a purchase history or a history about places to eat and drink) of users who have the similar tendency may be searched for on the basis of this feature quantity.

(10) In the first and second embodiments, the user terminal device 100 transmits the similarity value to the data computation device 200 after encrypting the similarity value; however, this encryption may be performed by the data computation device 200. That is, the similarity value encryption unit 105 of the user terminal device 100 may be included in the data computation device 200. Note that the similarity value need not be encrypted if there is no need to keep the similarity value confidential.

(11) In the first and second embodiments, the data computation device 200 includes the reference data storage unit 205; however, another device different from the data computation device 200 may include the reference data storage unit 205. In this case, the other device different from the data computation device 200 may be notified of the identifier ID that is extracted based on the feature quantity and the similarity value, and the other device may calculate the corresponding reference data.

(12) In the first and second embodiments, every reference data corresponding to each of the identifiers IDs and extracted as data similar to the feature quantity is transmitted to the user terminal device 100; however, every reference data is not necessarily transmitted all the time. That is, the data computation device 200 may select part of the reference data and transmit the selected part of the reference data to the user terminal device 100.

In addition, as illustrated in FIGS. 6 and 12, the data computation device 200 checks, for all the identifiers IDs in the reference data storage unit 205, whether the feature quantity is similar to the reference data by using the similarity values of 0 to D−1; however, the configuration is not limited to this one. For example, a method (nesting) for sequentially performing the check may be used in which the check is first performed for all the identifiers IDs using the similarity value of 0, and then performed using the similarity value of 1, and ultimately performed using the similarity value of D−1. If the distance matches any of the similarity values during the check, the corresponding identifier ID is extracted.

Further, for example, a method may be used in which the data computation device 200 predetermines the maximum number of pieces of encrypted reference data transmitted to the user terminal device 100, stops repeating the check upon the predetermined number being reached while the data computation device 200 is repeatedly performing the check, extracts and encrypts pieces of reference data corresponding to the extracted identifiers IDs, and returns the encrypted pieces of reference data to the user terminal device 100.

Note that the techniques described in the above embodiments and modifications can be implemented by using a cloud service of the following types, for example. However, the types of the cloud service that implements the techniques described in the above embodiments and modifications are not limited to these ones.

Service Type 1: Local-Data-Center-Based Cloud Service

Figure 14:
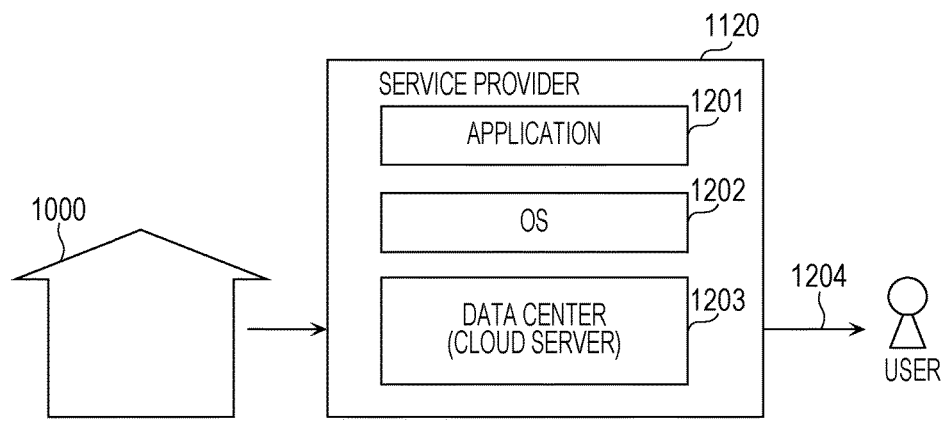
FIG. 14 is a block diagram illustrating an overview of a service provided by the similar-information search system of a service type 1 (local-data-center-based cloud service)

FIG. 14 is a block diagram illustrating an overview of a service provided by the similar-information search system of a service type 1 (local-data-center-based cloud service).

As illustrated in FIG. 14, in this type, the service provider 1120 obtains information from the group 1000 and provides a service to the user. In this type, the service provider 1120 functions as the data center operating company. That is, the service provider 1120 has a data center (cloud server) 1203 that manages big data. Accordingly, there is no data center operating company.

In this type, the service provider 1120 operates and manages the data center (cloud server) 1203. In addition, the service provider 1120 manages an operating system (OS) 1202 and an application 1201. The service provider 1120 provides a service by using the OS 1202 and the application 1201 managed thereby (arrow 1204).

Service Type 2: IaaS-Based Cloud Service

Figure 15:
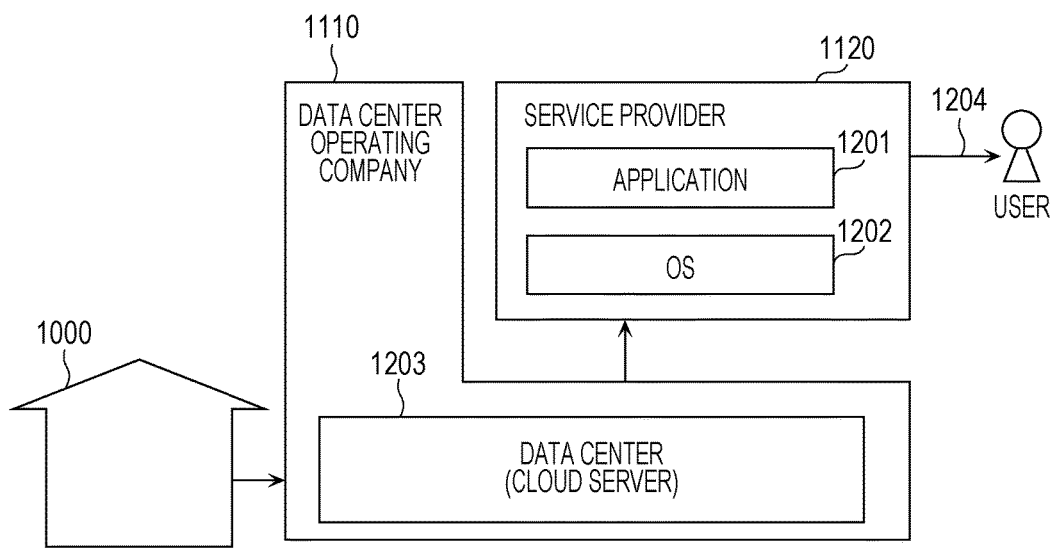
FIG. 15 is a block diagram illustrating an overview of a service provided by the similar-information search system of a service type 2 (IaaS-based cloud service)

FIG. 15 is a block diagram illustrating an overview of a service provided by the similar-information search system of a service type 2 (IaaS-based cloud service). The term "IaaS (infrastructure as a service)" refers to a cloud service providing model in which an infrastructure on which a computer system is constructed and operated is provided as a service via the Internet.

As illustrated in FIG. 15, in this type, the data center operating company 1110 operates and manages the data center (cloud server) 1203. In addition, the service provider 1120 manages the OS 1202 and the application 1201. The service provider 1120 provides the service by using the OS 1202 and the application 1201 managed thereby (arrow 1204).

Service Type 3: PaaS-Based Cloud Service

Figure 16:
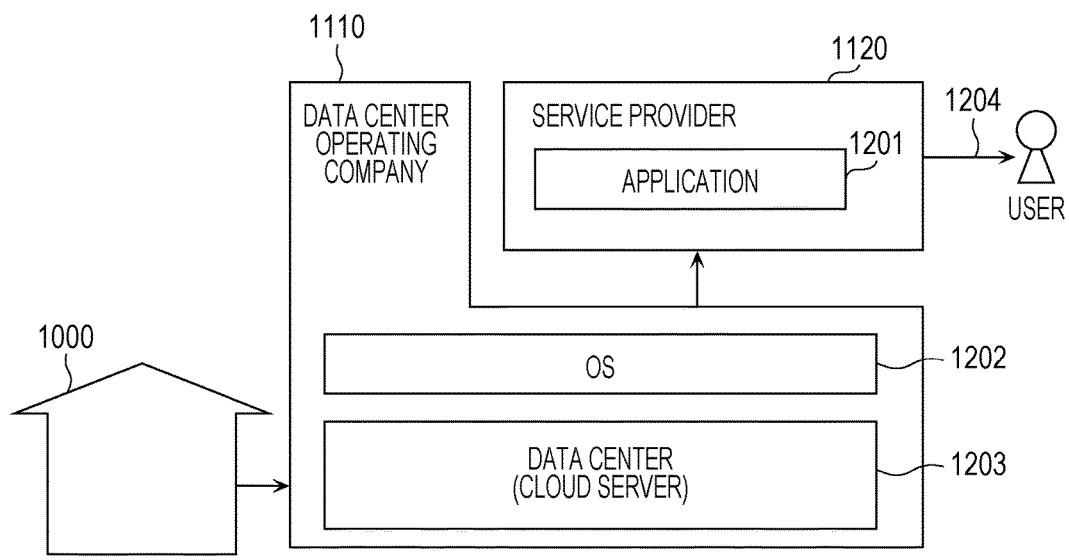
FIG. 16 is a block diagram illustrating an overview of a service provided by the similar-information search system of a service type 3 (PaaS-based cloud service)

FIG. 16 is a block diagram illustrating an overview of a service provided by the similar-information search system of a service type 3 (PaaS-based cloud service). The term "PaaS (platform as a service)" refers to a cloud service providing model in which a platform serving as a foundation for constructing and operating software is provided as a service via the Internet.

As illustrated in FIG. 16, in this type, the data center operating company 1110 manages the OS 1202 and operates and manages the data center (cloud server) 1203. In addition, the service provider 1120 manages the application 1201. The service provider 1120 provides the service by using the OS 1202 managed by the data center operating company 1110 and the application 1201 managed by the service provider 1120 (arrow 1204).

Service Type 4: SaaS-Based Cloud Service

Figure 17:
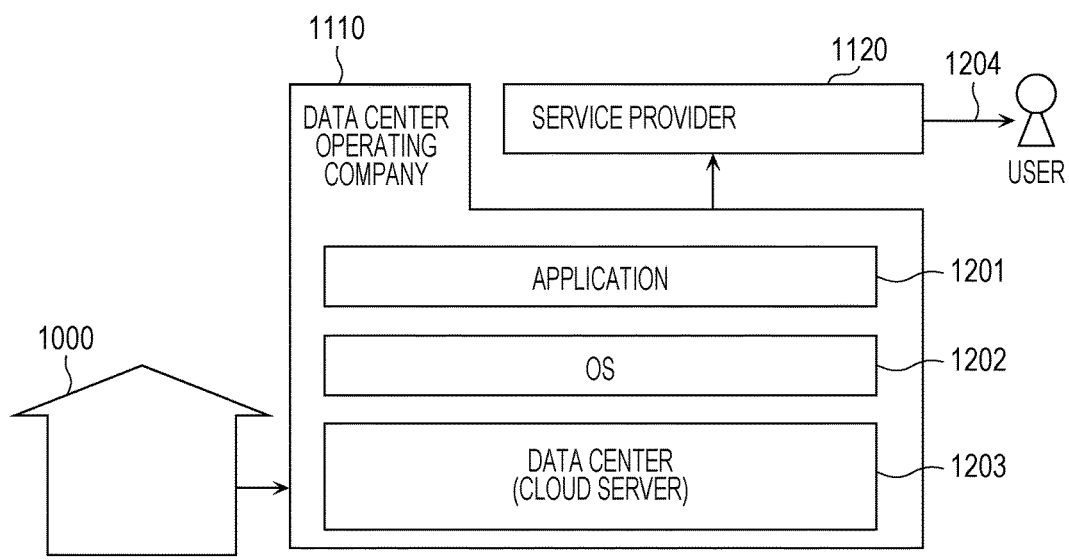
FIG. 17 is a block diagram illustrating an overview of a service provided by the similar-information search system of a service type 4 (SaaS-based cloud service).

FIG. 17 is a block diagram illustrating an overview of a service provided by the similar-information search system of a service type 4 (SaaS-based cloud service). The term "SaaS (software as a service)" refers to a cloud service providing model having a function that enables a user such as a company or person not owning the data center (cloud server)

1203 to use, via a network such as the Internet, the application 1201 provided by a platform provider that owns the data center (cloud server) 1203, for example.

As illustrated in FIG. 17, in this type, the data center operating company 1110 manages the application 1201 and the OS 1202 and operates and manages the data center (cloud server) 1203. In addition, the service provider 1120 provides the service using the OS 1202 and the application 1201 managed by the data center operating company 1110 (arrow 1204).

In any of the cloud service types 1 to 4 described above, the service provider 1120 provides the service. In addition, the service provider 1120 or the data center operating company 1110 may develop an OS, an application, or a database storing big data by itself, or let a third party do the development.

Embodiments obtained by making various modifications conceivable by a person skilled in the art on the first and second embodiments, the modifications, and the service types 1 to 4 or embodiments implemented by combining the elements and functions of the first and second embodiments, the modifications, and the service types 1 to 4 in a given manner within a scope not departing from the essence of the present disclosure are also included in the present disclosure.

The similar-information search method according to an aspect of the present disclosure allows a similar-information search to be performed, with content of a feature quantity kept confidential by encryption, and is applicable to a computer system that performs a similar-information search for cases of diseases, for example.

What is claimed is:

1. A search method for a similar-information search system including a terminal device and a server device that are connected to each other via a network, the server device including a first memory that stores a plurality of reference feature quantities and a second memory that stores a plurality of pieces of reference data each corresponding to one of the plurality of reference feature quantities, the search method comprising:
the server device receiving from the terminal device, a first encrypted feature quantity obtained by encrypting a first feature quantity using a first encryption scheme;
the server device obtaining a second encrypted feature quantity by encrypting, using the first encryption scheme, a first reference feature quantity that is one of the plurality of reference feature quantities stored in the first memory;
the server device receiving from the terminal device, an encrypted similarity value that is information obtained by encrypting, using the first encryption scheme, a similarity value indicating a degree of similarity;
the server device calculating an encrypted distance indicating a degree of similarity between the first encrypted feature quantity and the second encrypted feature quantity, with the first encrypted feature quantity and the second encrypted feature quantity kept encrypted;
the server device determining whether the calculated encrypted distance matches the received encrypted similarity value;
the server device obtaining from the second memory, first reference data that is data corresponding to the first reference feature quantity used in the calculating of the encrypted distance in a case where it is determined in the determining that the calculated encrypted distance matches the received encrypted similarity value;
the server device generating encrypted reference data by encrypting the obtained first reference data using a second encryption scheme; and
the server device transmitting the generated encrypted reference data to the terminal device.

2. The search method according to claim 1, wherein, in the receiving of the encrypted similarity value, a plurality of encrypted similarity values that are pieces of information obtained by encrypting a plurality of similarity values indicating a plurality of degrees of similarity are received, and
wherein, in the determining, it is determined, for each of the plurality of received encrypted similarity values, whether the calculated encrypted distance matches the received encrypted similarity value.

3. The search method according to claim 1, wherein the encrypted distance is a Euclidean distance between the first encrypted feature quantity and the second encrypted feature quantity.

4. The search method according to claim 1, further comprising:
the server device receiving a converted key value that is information obtained by converting a secret key of the terminal device using a certain function,
wherein, in the receiving of the encrypted similarity value, a converted similarity value that is information obtained by converting the similarity value using the certain function is received as the encrypted similarity value, and
wherein, in the determining, a converted distance is generated by decrypting the encrypted distance by using the converted key value and it is determined whether the generated converted distance matches the converted similarity value.

5. The search method according to claim 4, wherein the certain function is a one-way function.

6. The search method according to claim 1, further comprising:
the terminal device obtaining data subjected to a similar-information search;
the terminal device calculating the first feature quantity indicating a feature of the obtained data;
the terminal device generating the first encrypted feature quantity by encrypting the calculated first feature quantity using the first encryption scheme;
the terminal device transmitting the generated first encrypted feature quantity to the server device;
the terminal device setting the similarity value indicating a degree of similarity;
the terminal device generating the encrypted similarity value by encrypting the set similarity value using the first encryption scheme;
the terminal device transmitting the generated encrypted similarity value to the server device;
the terminal device receiving the encrypted reference data from the server device; and
the terminal device decrypting the received encrypted reference data by using the second encryption scheme.

7. The search method according to claim 1, wherein the first encryption scheme is a homomorphic encryption scheme.

8. A server device comprising:
a first memory that stores a plurality of reference feature quantities;
a second memory that stores a plurality of pieces of reference data each corresponding to one of the plurality of reference feature quantities; and
circuitry which, in operation;

receives, from a terminal device, a first encrypted feature quantity obtained by encrypting a first feature quantity using a first encryption scheme;

obtains a second encrypted feature quantity by encrypting, using the first encryption scheme, a first reference feature quantity that is one of the plurality of reference feature quantities stored in the first memory;

receives, from the terminal device, an encrypted similarity value that is information obtained by encrypting, using the first encryption scheme, a similarity value indicating a degree of similarity;

calculates an encrypted distance indicating a degree of similarity between the first encrypted feature quantity and the second encrypted feature quantity, with the first encrypted feature quantity and the second encrypted feature quantity kept encrypted;

determines whether the calculated encrypted distance matches the received encrypted similarity value;

obtains, from the second memory, first reference data that is data corresponding to the first reference feature quantity used in the calculation of the encrypted distance in a case where it is determined in the determination that the calculated encrypted distance matches the received encrypted similarity value;

generates encrypted reference data by encrypting the obtained first reference data using a second encryption scheme; and transmits the generated encrypted reference data to the terminal device.

9. A similar-information search system comprising a terminal device and a server device connected to each other via a network, the server device comprising:

a first memory that stores a plurality of reference feature quantities;

a second memory that stores a plurality of pieces of reference data each corresponding to one of the plurality of reference feature quantities; and circuitry which, in operation;

receives, from the terminal device, a first encrypted feature quantity obtained by encrypting a first feature quantity using a first encryption scheme;

obtains a second encrypted feature quantity by encrypting, using the first encryption scheme, a first reference feature quantity that is one of the plurality of reference feature quantities stored in the first memory;

receives, from the terminal device, an encrypted similarity value that is information obtained by encrypting, using the first encryption scheme, a similarity value indicating a degree of similarity;

calculates an encrypted distance indicating a degree of similarity between the first encrypted feature quantity and the second encrypted feature quantity, with the first encrypted feature quantity and the second encrypted feature quantity kept encrypted;

determines whether the calculated encrypted distance matches the received encrypted similarity value;

obtains, from the second memory, first reference data that is data corresponding to the first reference feature quantity used in the calculation of the encrypted distance in a case where it is determined in the determination that the calculated encrypted distance matches the received encrypted similarity value;

generates encrypted reference data by encrypting the obtained first reference data using a second encryption scheme; and transmits the generated encrypted reference data to the terminal device.

\* \* \* \* \*